(12) United States Patent
Nishizawa et al.

(10) Patent No.: US 10,670,428 B2
(45) Date of Patent: Jun. 2, 2020

(54) CIRCUIT DEVICE, PHYSICAL QUANTITY DETECTION DEVICE, ELECTRONIC APPARATUS, AND VEHICLE

(71) Applicant: Seiko Epson Corporation, Tokyo (JP)

(72) Inventors: Ryuta Nishizawa, Matsumoto (JP); Kei Kanemoto, Fujimi (JP); Takayuki Kikuchi, Chino (JP)

(73) Assignee: Seiko Epson Corporation (JP)

( * ) Notice: Subject to any disclaimer, the term of this patent is extended or adjusted under 35 U.S.C. 154(b) by 357 days.

(21) Appl. No.: 15/672,776

(22) Filed: Aug. 9, 2017

(65) Prior Publication Data

US 2018/0052012 A1    Feb. 22, 2018

(30) Foreign Application Priority Data

Aug. 18, 2016 (JP) ................................. 2016-160393

(51) Int. Cl.

| G01D 5/241 | (2006.01) |
| G01C 19/5776 | (2012.01) |
| G01C 19/5726 | (2012.01) |
| G01D 3/028 | (2006.01) |

(52) U.S. Cl.
CPC ......... *G01D 5/241* (2013.01); *G01C 19/5726* (2013.01); *G01C 19/5776* (2013.01); *G01D 3/028* (2013.01)

(58) Field of Classification Search
CPC .... G01D 5/241; G01D 3/028; G01C 19/5726; G01C 19/5776

USPC ......................................................... 324/660
See application file for complete search history.

(56) References Cited

U.S. PATENT DOCUMENTS

| 5,780,740 | A | 7/1998 | Lee et al. |
| 8,763,460 | B2 * | 7/2014 | Kim ................... G01C 19/5755 |
| | | | 73/504.12 |
| 2001/0008087 | A1 | 7/2001 | Mochida |
| 2011/0238363 | A1* | 9/2011 | Nakamura ............ G01C 19/56 |
| | | | 702/141 |
| 2017/0167876 | A1* | 6/2017 | Coronato ........... G01C 19/5776 |

FOREIGN PATENT DOCUMENTS

| JP | 09-178493 A | 7/1997 |
| JP | 2001-194157 A | 7/2001 |
| JP | 3264580 B2 | 3/2002 |
| JP | 2013-181957 A | 9/2013 |

* cited by examiner

*Primary Examiner* — Melissa J Koval
*Assistant Examiner* — Rahul Maini
(74) *Attorney, Agent, or Firm* — Harness, Dickey & Pierce, P.L.C.

(57) ABSTRACT

A circuit device adapted to perform detection of angular velocity observed by a capacitance type angular velocity transducer includes a drive device, a detection device, a vibration frequency controller adapted to variably control at least one of a detection frequency and a drive frequency of the capacitance type angular velocity transducer, and a storage adapted to store a correction parameter group adapted to correct a sensor characteristic of the capacitance type angular velocity transducer due to a variation of at least one of the detection frequency and the drive frequency.

12 Claims, 12 Drawing Sheets

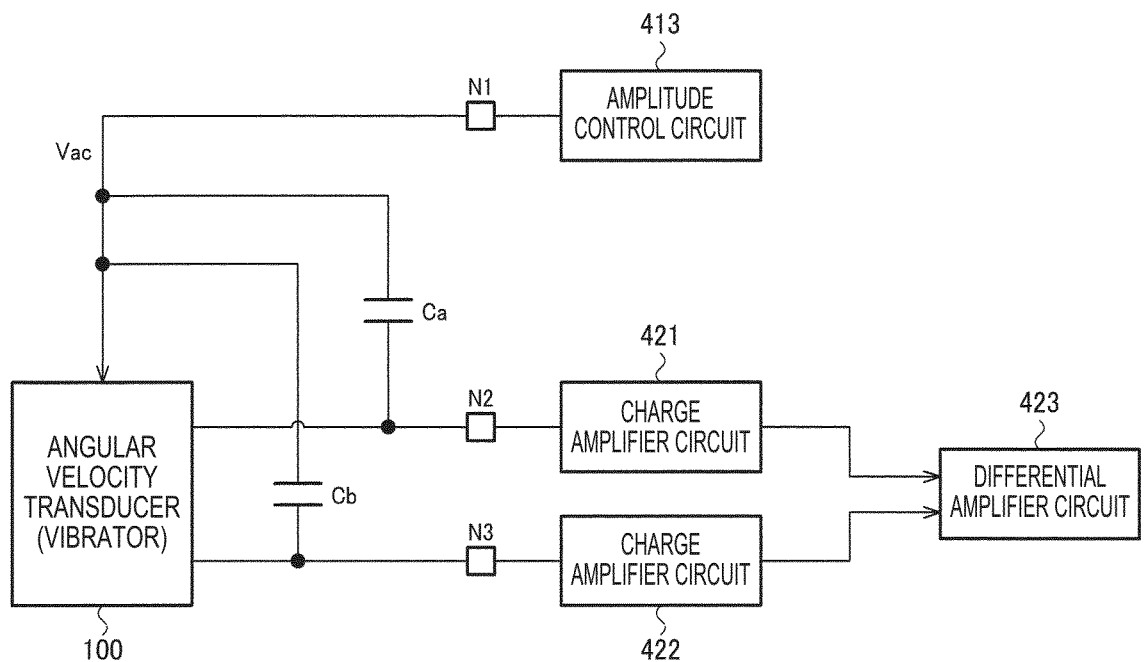

FIG. 13

| MISTUNED FREQUENCY SETTING VALUE 1 (FIRST CORRECTION PARAMETER) | MISTUNED FREQUENCY SETTING VALUE 2 (SECOND CORRECTION PARAMETER) | MISTUNED FREQUENCY SETTING VALUE 3 (THIRD CORRECTION PARAMETER) | ... | MISTUNED FREQUENCY SETTING VALUE n (n-th CORRECTION PARAMETER) |
|---|---|---|---|---|
| ELECTROSTATIC SPRING SETTING VALUE 1 (Vdc) | ELECTROSTATIC SPRING SETTING VALUE 2 | ELECTROSTATIC SPRING SETTING VALUE 3 | ... | ELECTROSTATIC SPRING SETTING VALUE n |
| DRIVE AMPLITUDE SETTING VALUE 1 (Vac) | DRIVE AMPLITUDE SETTING VALUE 2 | DRIVE AMPLITUDE SETTING VALUE 3 | ... | DRIVE AMPLITUDE SETTING VALUE n |
| OFFSET CORRECTION VALUE 1 | OFFSET CORRECTION VALUE 2 | OFFSET CORRECTION VALUE 3 | ... | OFFSET CORRECTION VALUE n |
| GAIN SETTING VALUE 1 | GAIN SETTING VALUE 2 | GAIN SETTING VALUE 3 | ... | GAIN SETTING VALUE n |
| TEMPERATURE CHARACTERISTIC CORRECTION VALUE 1 | TEMPERATURE CHARACTERISTIC CORRECTION VALUE 2 | TEMPERATURE CHARACTERISTIC CORRECTION VALUE 3 | ... | TEMPERATURE CHARACTERISTIC CORRECTION VALUE n |

FIG. 14

CIRCUIT DEVICE, PHYSICAL QUANTITY DETECTION DEVICE, ELECTRONIC APPARATUS, AND VEHICLE

BACKGROUND

1. Technical Field

The present invention relates to a circuit device, a physical quantity detection device, an electronic apparatus, a vehicle, and so on.

2. Related Art

In the past, there has been widely known a capacitance type angular velocity sensor (a gyro sensor). As the capacitance type angular velocity sensor, there is known a sensor or the like using an MEMS (Micro Electro-Mechanical Systems) vibrator.

In JP-A-2001-194157 (Document 1), there is disclosed a gyro sensor having a structure in which a gyro element is connected to a frame via a spring in order to absorb an impact in an inter-plane direction (an X-axis direction) to the gyro element. Further, in JP-A-09-178493 (Document 2), there is disclosed a capacitance type angular velocity sensor, and a method of varying a voltage to be applied to the electrode to vary the effective stiffness (the effective spring constant) to thereby vary the natural frequency.

In the angular velocity sensor, the angular velocity due to a rotational vibration different from the desired rotation is detected in some cases. For example, in the case in which the angular velocity sensor is mounted on a given substrate, due to the vibration of the substrate, the angular velocity sensor erroneously detects the angular velocity having the frequency component corresponding to the resonant frequency of the substrate. In particular, in the vibration type angular velocity sensor, although the gain with respect to the signal is determined in accordance with the difference (mistuned frequency) between the drive frequency and the detection frequency, there is a possibility that the extremely high gain is applied to the signal to saturate the signal in the case in which the resonant frequency of the substrate and the mistuned frequency are close to each other.

Although in Document 1, there is described a spring structure for absorbing the impact, the attenuation effect of the rotational vibration cannot be obtained. Further, since in Document 2, there is disclosed a method of changing the natural frequency, it is possible to change the mistuned frequency by using the method of Document 2. However, in the case in which the mistuned frequency has been changed, a variety of sensor characteristics have also changed in conjunction with the change, and therefore, appropriate circuit parameters (e.g., a gain and an offset correction value) in the circuit device have changed. However, in Document 2 there is disclosed no method corresponding to the change of the circuit parameters.

SUMMARY

An advantage of some aspects of the invention is to provide a circuit device, a physical quantity detection device, an electronic apparatus, a vehicle, and so on adapted to appropriately prevent the influence of the rotational vibration even in the case in which the rotational vibration not subject to detection is input.

The invention can be implemented as the following forms or embodiments.

An aspect of the invention relates to a circuit device adapted to perform detection of angular velocity observed by a capacitance type angular velocity transducer including a vibration frequency controller adapted to variably control at least one of a detection frequency and a drive frequency of the capacitance type angular velocity transducer, a detection circuit adapted to detect angular velocity based on a detection signal from the angular velocity transducer, a drive circuit adapted to perform drive of vibrating the capacitance type angular velocity transducer, and a storage adapted to store a correction parameter group adapted to correct a sensor characteristic of the capacitance type angular velocity transducer due to a variation of at least one of the detection frequency and the drive frequency.

In this aspect of the invention, in the circuit device adapted to perform drive of the capacitance type angular velocity transducer, and detection of the angular velocity based on the detection signal from the capacitance type angular velocity transducer, at least one of the detection frequency and the drive frequency is variably controlled, and at the same time, the correction parameter group for correcting the sensor characteristic of the capacitance type angular velocity transducer due to the control is stored. According to this configuration, since the mistuned frequency is variable, it is possible to prevent the signal from being saturated in the circuit device due to the phenomenon that the frequency of the input angular velocity and the mistuned frequency come close to each other. Further, since the variation of the sensor characteristic due to the variation of the mistuned frequency can be corrected using the correction parameter group stored in advance, the angular velocity detection high in accuracy can easily be realized.

In the aspect of the invention, the storage may store as the correction parameter group a first correction parameter for a case in which a mistuned frequency as a difference between the drive frequency and the detection frequency is set to a first setting value, and a second correction parameter for a case in which the mistuned frequency is set to a second setting value different from the first setting value.

According to this configuration, since it is possible to store the correction parameter in advance for each setting of the mistuned frequency, when a given mistuned frequency is set, it becomes possible to perform an appropriate correction corresponding to the mistuned frequency.

In the aspect of the invention, each of the first correction parameter and the second correction parameter may include at least one of a drive amplitude setting value, an offset correction value, a gain setting value, and a temperature characteristic correction value.

According to this configuration, it becomes possible to correct at least one of the characteristics, namely the amplitude, the offset, the gain, and the temperature characteristic in the drive system in accordance with the mistuned frequency.

In the aspect of the invention, the vibration frequency controller may vary an effective spring constant of the capacitance type angular velocity transducer to thereby vary at least one of the drive frequency and the detection frequency.

According to this configuration, it becomes possible to vary the drive frequency and the detection frequency by varying the effective spring constant.

In the aspect of the invention, the vibration frequency controller may vary an electrostatic spring constant of the capacitance type angular velocity transducer to thereby vary at least one of the drive frequency and the detection frequency.

According to this configuration, it becomes possible to vary the drive frequency and the detection frequency by varying the electrostatic spring constant.

In the aspect of the invention, the storage may be a nonvolatile memory.

According to this configuration, since it is possible to realize the storage with the nonvolatile memory, it becomes possible to appropriately keep the correction parameter group.

In the aspect of the invention, the detection circuit may perform a detection operation based on either of correction parameters in the correction parameter group stored in the storage.

According to this configuration, by using the correction parameter, it becomes possible to perform the detection operation corresponding to the mistuned frequency.

In the aspect of the invention, the circuit device may further include a saturated state detection circuit adapted to detect a saturated state of a detection signal in the detection circuit, and the detection circuit may perform the detection operation based on the correction parameter selected based on a detection result in the saturated state detection circuit.

According to this configuration, the selection of the correction parameter and the detection operation in the detection circuit using the correction parameter become possible based on the detection result of the saturated state.

In the aspect of the invention, the drive circuit may perform a drive operation based on either of correction parameters in the correction parameter group stored in the storage.

According to this configuration, by using the correction parameter, it becomes possible to perform the drive operation corresponding to the mistuned frequency.

In the aspect of the invention, the circuit device may further include a saturated state detection circuit adapted to detect a saturated state of a detection signal in the detection circuit, and the drive circuit may perform the drive operation based on the correction parameter selected based on a detection result in the saturated state detection circuit.

According to this configuration, the selection of the correction parameter and the drive operation in the drive circuit using the correction parameter become possible based on the detection result of the saturated state.

Another aspect of the invention relates to a physical quantity detection device including any one of the circuit devices described above, and the capacitance type angular velocity transducer.

Still another aspect of the invention relates to an electronic apparatus including any one of the circuit devices described above.

Still another aspect of the invention relates to a vehicle including any one of the circuit devices described above.

BRIEF DESCRIPTION OF THE DRAWINGS

The invention will be described with reference to the accompanying drawings, wherein like numbers reference like elements.

FIG. 13 is an explanatory diagram of electrostatic coupling.

FIG. 14 is a diagram showing an example of a data structure of a correction parameter group.

DESCRIPTION OF EXEMPLARY EMBODIMENTS

Hereinafter, some preferred embodiments of the invention will be described in detail. It should be noted that the embodiments described hereinafter do not unreasonably limit the content of the invention as set forth in the appended claims, and all of the constituents described in the embodiments are not necessarily essential as the elements of the invention for solving the problems.

1. Method According to Present Embodiment

Figure 1:
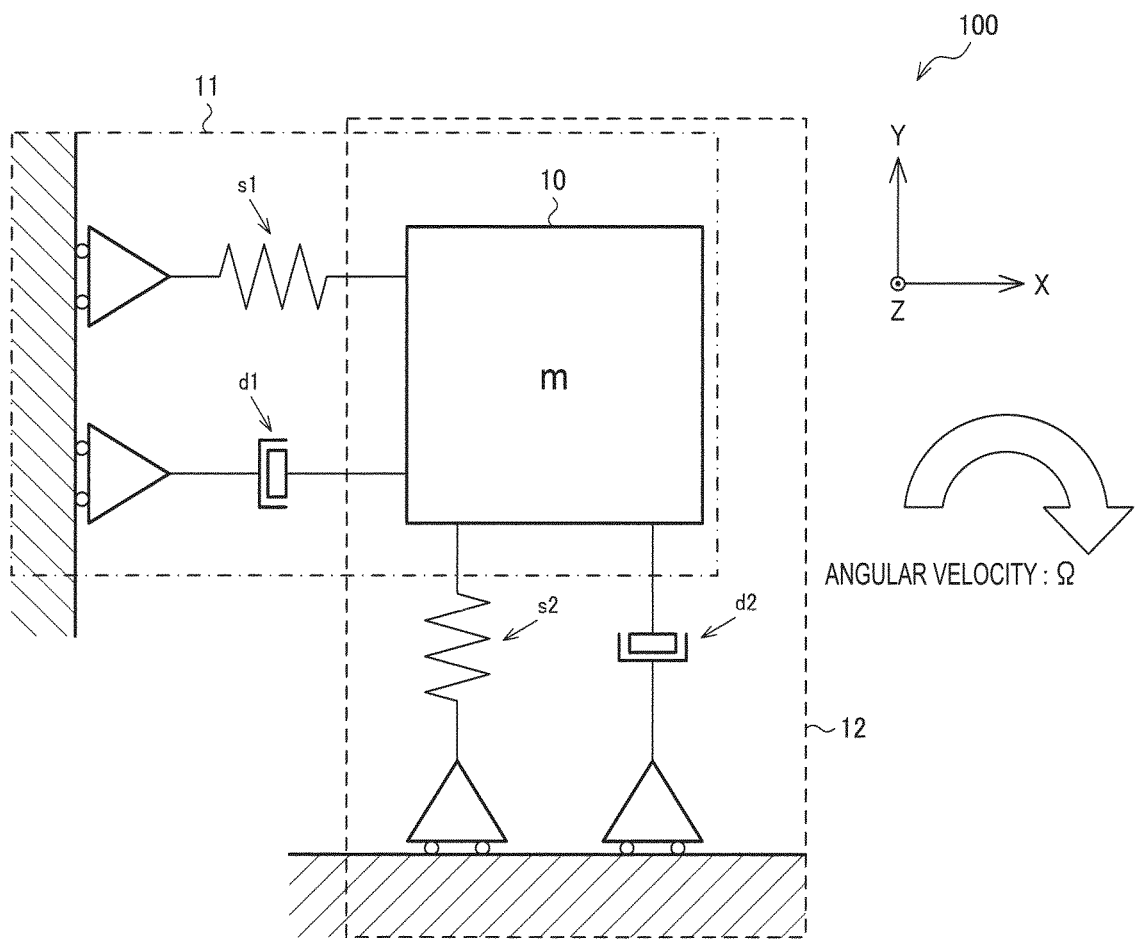
FIG. 1 is a diagram obtained by modeling a configuration of a vibration type angular velocity transducer.

FIG. 1 is a diagram obtained by modeling an angular velocity transducer 100 as a vibration type angular velocity sensor (a vibratory gyroscope). As shown in FIG. 1, the angular velocity transducer 100 includes a vibrating body 10, a drive system 11, and a detection system 12, and the drive system 11 and the detection system 12 can be modeled respectively by springs (s1, s2) and dampers (d1, d2). It should be noted that the specific construction example of the angular velocity transducer 100 will be described later with reference to FIG. 10.

The angular velocity transducer 100 vibrates a vibrating body 10 in the drive system 11 based on a drive signal output (a drive voltage applied) from a circuit device 40. It should be noted that the drive signal here is assumed as a signal including both of a direct-current voltage Vdc and an alternating-current voltage Vac·sin (ωt) described later.

When angular velocity is applied to an object moving at certain speed, Coriolis force is caused in a direction perpendicular to the speed direction and the angular velocity direction. In the example shown in FIG. 1, in the case in which the angular velocity around the Z axis is applied in the condition in which the vibrating body 10 in the drive system 11 is vibrated in the X-axis direction, there occurs the Coriolis force in the Y-axis direction. In the angular velocity transducer 100, by detecting the displacement in the Y-axis direction of the vibrating body 10 using the detection system 12, the angular velocity around the Z axis can be detected.

Here, it is assumed that the displacement at the time t in the X-axis direction of the vibrating body 10 has been $A \cdot \sin(\omega_0 t)$ due to the drive in the drive system 11. Here, the reference symbol A denotes a constant representing the drive amplitude. The reference symbol $\omega_0$ denotes a constant expressed by $\omega_0 = 2\pi f_0$ in the case of setting the drive frequency as the natural frequency of the drive system 11 to $f_0$. A specific value of $\omega_0$ is determined by the spring constant of the spring s1 included in the drive system 11. It is known that the Coriolis force Fc generated is proportional to the mass m of the vibrating body 10, the magnitude $\Omega(t)$ of the angular velocity applied to the vibrating body 10, and a differential value (the speed) of the displacement in the drive vibration direction of the vibrating body 10, and the Coriolis force Fcy in the Y-axis direction in FIG. 1 can be expressed as Formula (1) below.

$$Fcy = -2 \cdot A \cdot \omega_0 \cdot m \cdot \Omega(t) \cdot \cos(\omega_0 t) \quad (1)$$

Here, it is assumed that the angular velocity applied varies with time, and includes the component of the frequency $f_\Omega$ ($=\omega_\Omega/(2\pi)$). In this case, it results that the angular velocity $\Omega(t)$ includes the component expressed as Formula (2) below. By modifying Formula (1) described above using Formula (2) below, Formula (3) below is obtained.

$$\Omega(t) = \Omega \cdot \cos(\omega_\Omega t + \varphi) \quad (2)$$

$$Fcy = -A \cdot \omega_0 \cdot m \cdot \Omega \cdot \{\cos((\omega_0 - \omega_\Omega) \cdot t - \varphi) + \cos((\omega_0 + \omega_\Omega) \cdot t + \varphi)\} \quad (3)$$

As is understood from Formula (3) described above, the Coriolis force generated includes a component of the frequency obtained by adding the frequency $f_\Omega$ of the input angular velocity to the drive frequency $f_0$ and a component of the frequency obtained by subtracting the frequency $f_\Omega$ of the input angular velocity from the drive frequency $f_0$.

Figure 2:
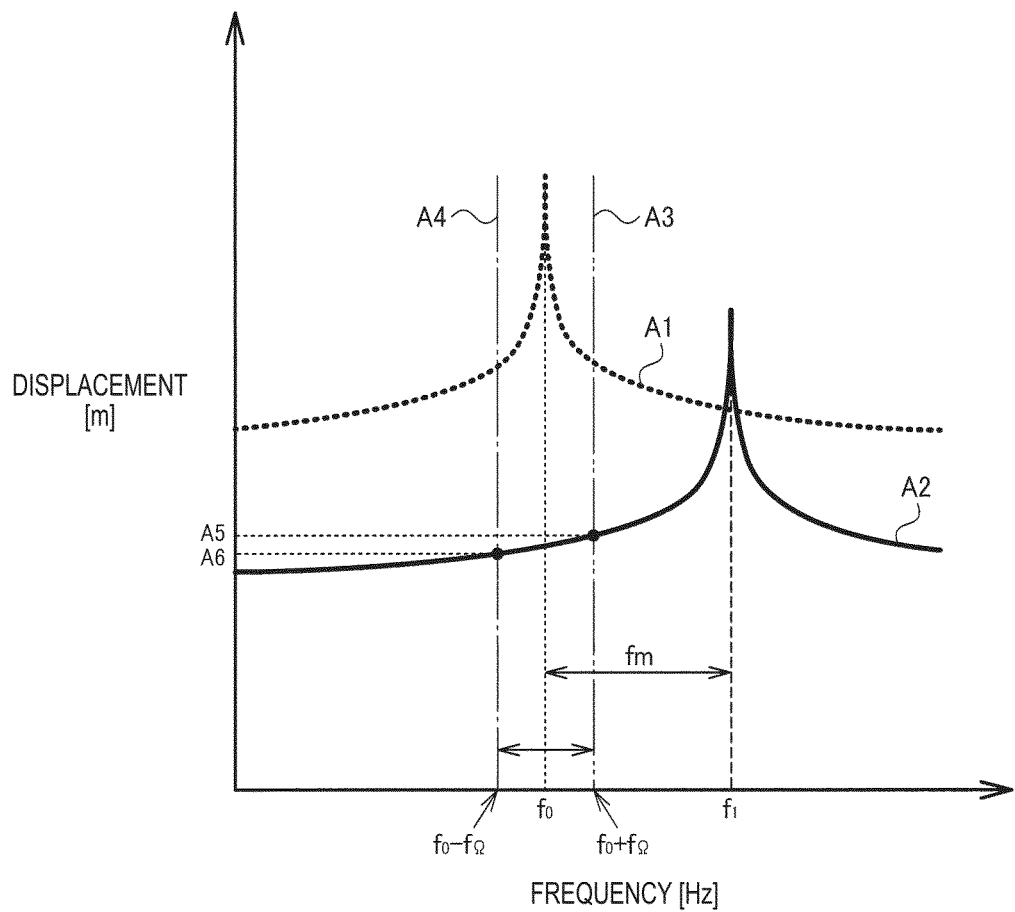
FIG. 2 is a diagram for explaining the characteristics of the vibration type angular velocity transducer.

FIG. 2 is a graph for explaining the characteristics and the operation of the vibration type angular velocity transducer 100. In FIG. 2, the horizontal axis represents the frequency, and the vertical axis represents the displacement of the vibrating body 10. It should be noted that logarithmic expression is applied to the vertical axis in FIG. 2. The curve A1 shown in FIG. 2 represents the vibration characteristic in the drive system 11, and the curve A2 represents the vibration characteristic in the detection system 12. As is understood from FIG. 2, the vibration in the drive system 11 has a peak at the drive frequency $f_0$, and decreases as the frequency of the vibration gets away from the drive frequency $f_0$. Similarly, the vibration in the detection system 12 has a peak at the detection frequency $f_1$ corresponding to the natural frequency of the detection system 12, and decreases as the frequency of the vibration gets away from the detection frequency $f_1$.

As described above, due to the Coriolis force, the detection system 12 is excited at the frequency of $f_0+f_\Omega$ indicated by the line A3 in FIG. 2, and the frequency of $f_0-f_\Omega$ indicated by the line A4 in FIG. 2. The characteristic of the detection system 12 is as represented by the curve A2, and the amplitude of the vibration in the detection system 12 due to the excitation becomes the level A5 with respect to the frequency $f_0+f_\Omega$, and becomes the level A6 with respect to the frequency $f_0-f_\Omega$. In other words, the closer to the detection frequency $f_1$ the frequency of the excitation is, the larger the amplitude becomes (the higher the gain becomes). It should be noted that hereinafter, the difference between the drive frequency $f_0$ and the detection frequency $f_1$ is defined as a mistuned frequency fm. In the example shown in FIG. 2, $fm = f_1 - f_0$ is true.

Figure 3:
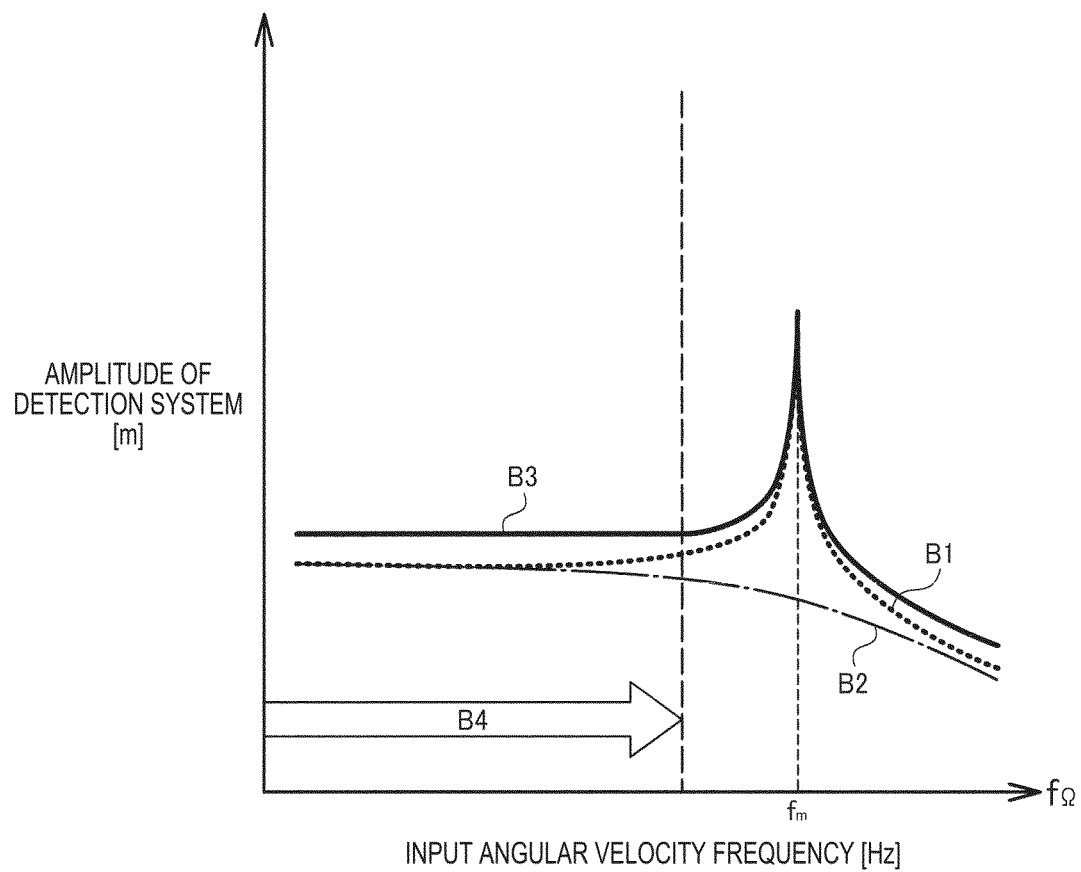
FIG. 3 is a relational diagram between the frequency of input angular velocity and the amplitude in a detection system.

FIG. 3 is a diagram for explaining the relationship between the frequency and the amplitude value of the input angular velocity. In FIG. 3, the horizontal axis represents the frequency $f_\Omega$ of the input angular velocity, and the vertical axis represents the amplitude of the vibration in the detection system 12. It should be noted that logarithmic expression is applied to both of the vertical axis and the horizontal axis in FIG. 3. The curve B1 shown in FIG. 3 represents the vibration amplitude due to the vibration at the frequency $f_0+f_\Omega$, and the curve B2 represents the vibration amplitude due to the vibration at the frequency $f_0-f_\Omega$. Here, as shown in FIG. 2, $f_0<f_1$ is assumed. Therefore, the higher the frequency $f_\Omega$ becomes, the larger the difference between $f_0-f_\Omega$ and $f_1$ becomes, and the amplitude represented by the curve B2 decreases monotonically. In the case of FIG. 2, it results that the frequency $f_0-f_\Omega$ represented by the line A4 moves leftward as the frequency $f_\Omega$ increases. In contrast, as the frequency $f_\Omega$ increases, the frequency $f_0+f_\Omega$ and the frequency $f_1$ come closer to each other, and the amplitude represented by the curve B1 has a local maximum value at the frequency $f_\Omega = fm$, and thereafter decreases monotonically. In the case of FIG. 2, it results that the frequency $f_0+f_\Omega$ represented by the line A3 moves rightward as the frequency $f_\Omega$ increases. As a result, the sum signal B3 ($=B1+B2$) by both of the excitations becomes to have the characteristic shown in FIG. 3.

In the angular velocity sensor, in the case in which the angular velocity with the given magnitude is input, it is preferable for the signal value to be constant, and it is undesirable that the sensitivity varies due to the temporal change (frequency characteristic) of the angular velocity. Therefore, as the frequency band of the input angular velocity to be the detection target of the angular velocity sensor, it is preferable to use the band in which the output (B3) is flat as indicated by the arrow B4 in FIG. 3.

Figure 4:
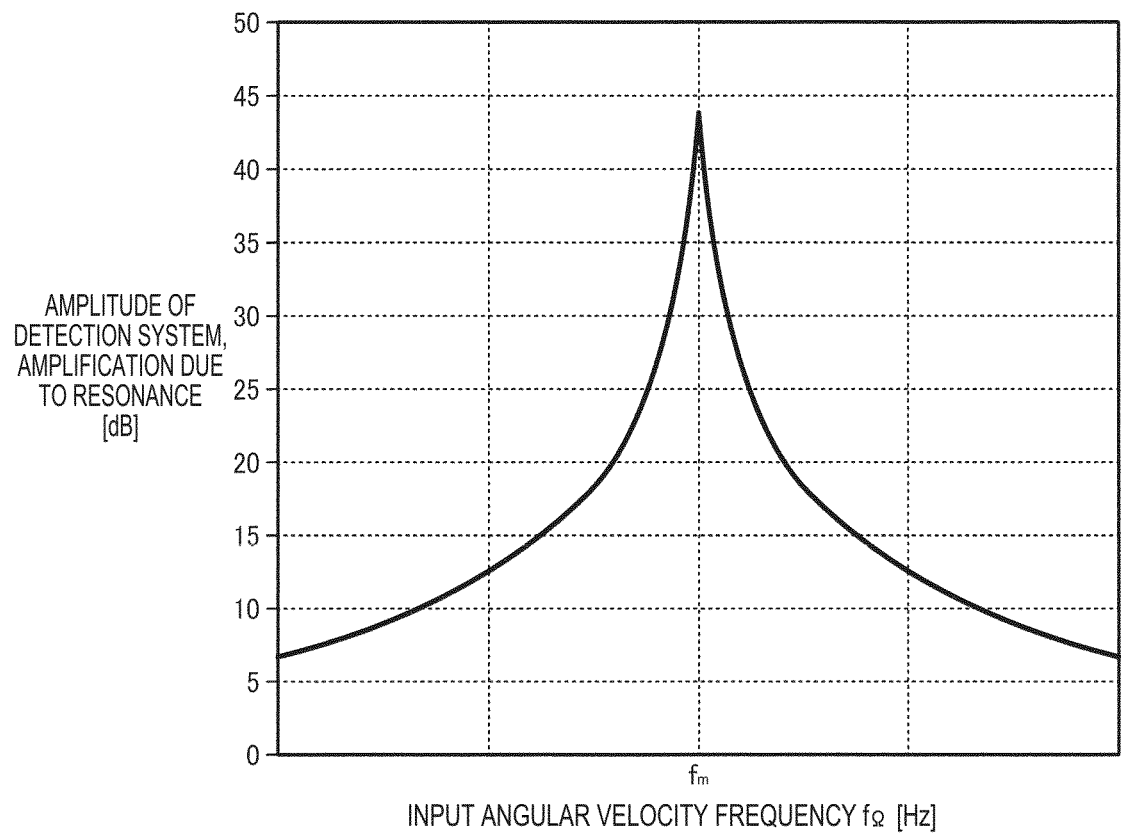
FIG. 4 is a relational diagram between the frequency of the input angular velocity and the gain of an output signal.

FIG. 4 is a diagram for explaining in detail the characteristic in the frequencies around $f_\Omega = fm$ shown in FIG. 3. In FIG. 4, the horizontal axis represents the frequency $f_\Omega$ of the input angular velocity, and the vertical axis represents the amplification (dB) of the vibration in the detection system 12. It should be noted that the vertical axis in FIG. 4 represents the amplification amount based on the amplitude in the band to be the detection target. As is understood from FIG. 4, in the case in which the frequency $f_\Omega$ of the input angular velocity has come close to the mistuned frequency fm, a signal roughly two to four digits larger, for example, compared to the Coriolis signal within the band (B4 in FIG. 3) is output from the angular velocity transducer 100 to the circuit device 40.

On such a condition, it has been found out that a problem occurs in some case in installing the angular velocity transducer 100 or a physical quantity detection device 300 including the angular velocity transducer 100 to a product. Specifically, there is a case in which a rotational vibration is input to the angular velocity transducer 100 due to the resonance of the substrate on which the angular velocity transducer 100 is mounted.

Figure 5:
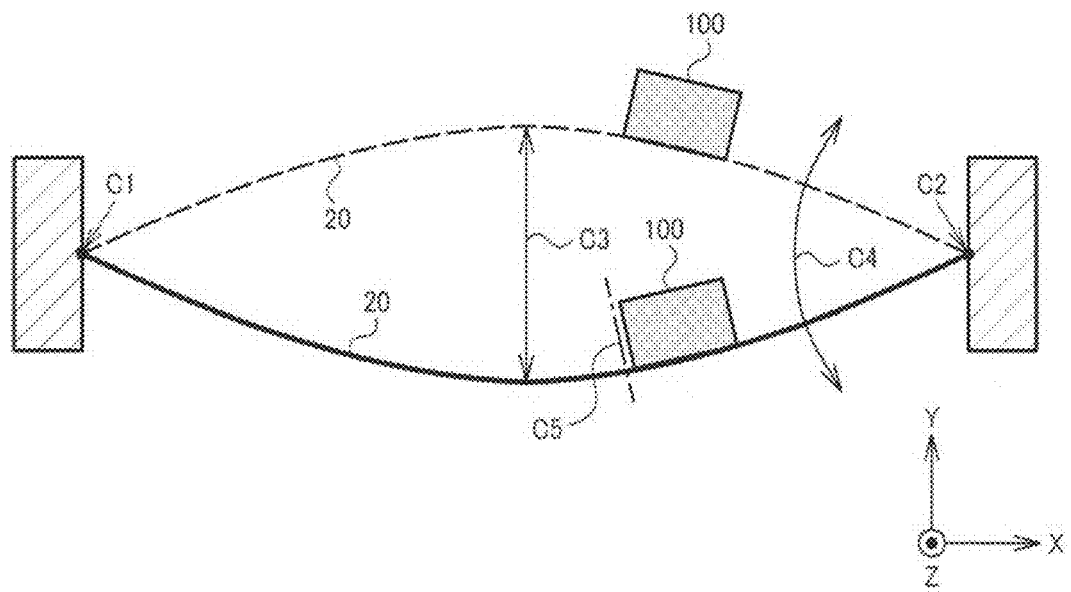
FIG. 5 is an explanatory diagram of the fact that a rotational vibration is input due to the resonance of a substrate.

FIG. 5 is a diagram for explaining the resonance of the substrate. FIG. 5 is a diagram of the substrate 20, on which the angular velocity transducer 100 is mounted, viewed from the side surface. It should be noted that although in FIG. 5, it is assumed that the angular velocity transducer 100 is mounted on the substrate 20, it is also possible to mount the physical quantity detection device 300 including the angular velocity transducer 100 and the circuit device 40 on the substrate 20 as a single package. Further, the detection axis (the axis extending along the direction in which the Coriolis force is detected by the detection system 12) of the angular velocity transducer 100 is assumed as the direction indicated by the line C5.

In the example shown in FIG. 5, the substrate 20 is fixed to another member at two end points C1 and C2 different in position in the X-axis direction. In the case in which predetermined force is applied to the substrate 20, the substrate 20 vibrates in the Y-axis direction as a result, and in the example shown in FIG. 5, the substrate 20 performs a vibration with the end points C1 and C2 used as the nodes. On this occasion, the substrate 20 performs the translational motion (C3) along the Y axis in the antinode (a central part of the substrate 20 in the example shown in FIG. 5) of the vibration, but includes the rotational motion in other parts as a result. Therefore, in the case in which the angular velocity transducer 100 is installed in a part other than the antinode of the vibration as shown in FIG. 5, the rotational vibration (e.g., C4) around the Z axis is input to the angular velocity transducer 100, and the frequency $f_\Omega$ of the input angular velocity corresponds to the natural frequency of the substrate 20 as a result. The natural frequency of the substrate 20 is determined by the size (the area and the thickness), the material, and so on of the substrate, but is in a somewhat similar range regardless of what product the substrate is installed to, and becomes the frequency in a range of about several hundreds Hz through several kHz.

On the other hand, regarding the mistuned frequency fm of the angular velocity transducer 100 (the vibration type angular velocity sensor), the range thereof is somewhat limited. The reason is as follows. As shown in FIG. 2, in the vibration type angular velocity transducer 100, the gain of the detection signal is determined by a resonance gain, which is a degree of overlap between the drive mode (A1) and the detection mode (A2). Therefore, if the mistuned frequency fm is too low, the variation in gain of the detection signal becomes large, and if the mistuned frequency fm is too high, the gain becomes low to degrade the detection accuracy of the angular velocity. Taking this point into consideration, the mistuned frequency fm is desirably set in a certain range, and is specifically set in the range of about several hundreds Hz through several kHz in most cases.

As a result, there is a possibility that there occurs the case in which the frequency $f_\Omega$ of the input angular velocity due to the resonance of the substrate 20 and the mistuned frequency fm become close to each other. In fact, it has been found out that in some cases the angular velocity due to the resonance of the substrate 20 is input to the circuit device 40 as an extremely large signal in the case of installing the physical quantity detection device 300 to an electronic apparatus 200 or a vehicle.

In the circuit device 40 to which the signal from the angular velocity transducer 100 is input, a configuration of reducing frequency components outside the desired band is included in many cases, and a filter circuit 429 is provided also in the example described later with reference to FIG. 9. Therefore, it is conceivable that it is possible to eliminate the component corresponding to the mistuned frequency fm by the filter circuit 429.

Figure 6:
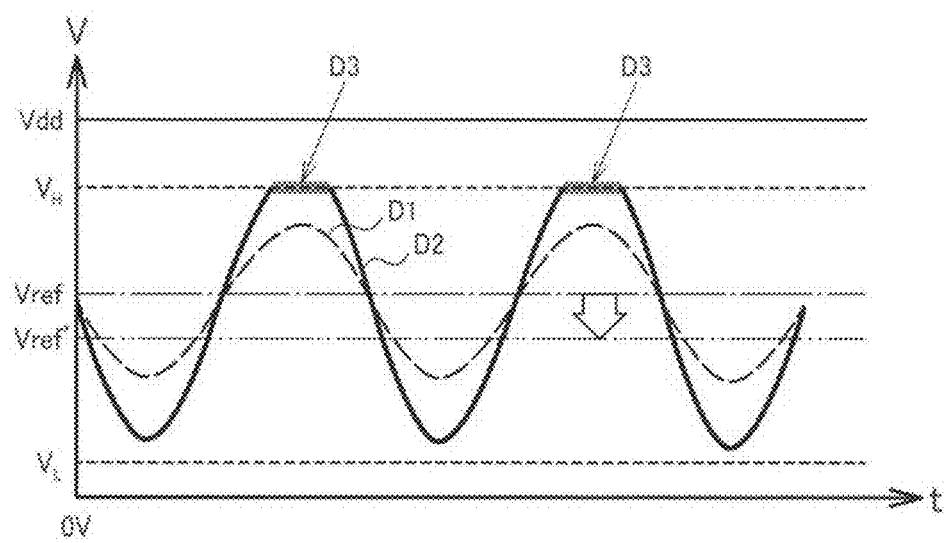
FIG. 6 is an explanatory diagram of the fact that a signal is saturated in a circuit device.

However, in the case in which an unexpectedly large signal is input, since the signal is saturated as a result, it is difficult to detect the appropriate angular velocity even if the filter process is performed. FIG. 6 is a diagram showing a signal example in the circuit device 40. The horizontal axis of FIG. 6 represents the time, and the vertical axis thereof represents the signal value (voltage value). Further, in FIG. 6, it is assumed that the voltage range in the circuit device 40 is $V_L$ through $V_H$.

The curves D1, D2 both have the center of the wavelength at Vref. In the curve D1, since the signal value is within the expected range, the signal in the circuit device 40 is within the voltage range of the circuit device 40. In contrast, the curve D2 represents the example in which an excessively large signal is input, and the signal is saturated at $V_H$ (D3). Therefore, in the case in which the process of detecting the waveform center of the curve D2 is performed in the circuit device 40, there occurs the problem that the voltage of the waveform center, which is originally Vref, is erroneously detected as Vref' as a result, and this problem cannot be resolved even using the filter circuit.

As described above, in the vibration type angular velocity sensor, there is a problem that since the extremely large signal is output due to the rotational vibration not subject to detection, there is a possibility that the appropriate detection of the angular velocity cannot be performed.

In contrast, if there is provided a structure of suppressing the vibration in the detection system 12 due to the rotational vibration not subject to detection in the case in which the rotational vibration is applied, the problem described above can be resolved. However, it is difficult for the structure for impact absorption to suppress the rotational vibration as in Document 1 and so on.

Therefore, in the present embodiment, the mistuned frequency fm of the capacitance type angular velocity transducer 100 is controlled. The drive frequency $f_0$ is determined by the effective spring constant of the spring s1 of the drive system 11, and the detection frequency $f_1$ is determined by the effective spring constant of the spring s2 of the detection system 12. Therefore, by changing the effective spring constant of at least one of the drive system 11 and the detection system 12, it is possible to change the mistuned frequency fm. In other words, even if the mistuned frequency fm and the frequency (the natural frequency of the substrate 20) of the rotational vibration not subject to detection become close to each other in the given setting, it is conceivable that the problem described above can be resolved by changing the setting to change the mistuned frequency fm.

However, in the case of simply changing the mistuned frequency fm alone, the circuit device 40 fails to appropriately detect the angular velocity in some cases. This is because in the case in which the mistuned frequency fm has been changed, the sensor characteristic also changes in conjunction therewith. Although the specific example will be described later, since the output (a zero point) in the rest state and the output (sensitivity) with respect to unit angular velocity vary, it is necessary to change circuit parameters such as an offset correction value or a gain setting value together with the mistuned frequency fm.

Figure 7:
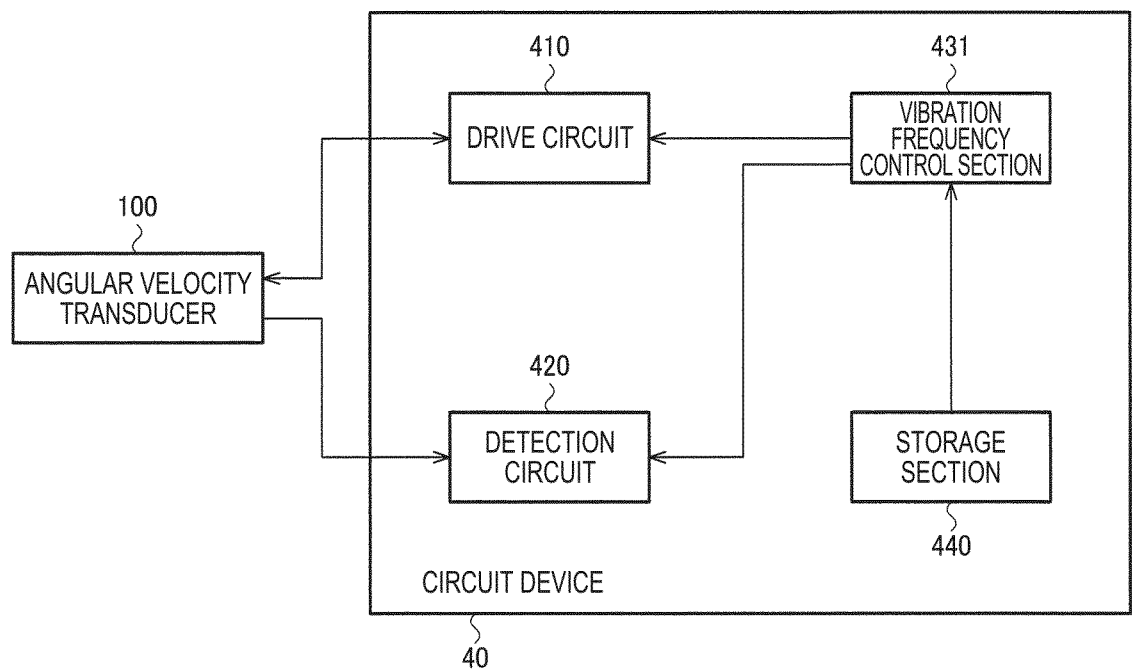
FIG. 7 is a diagram showing a configuration example of the circuit device.

Based on the above, the applicant proposes a method capable of resolving the problem described above to appropriately detect the angular velocity. As shown in FIG. 7, the circuit device 40 according to the present embodiment is a circuit device for performing detection of angular velocity by the capacitance type angular velocity transducer 100, and includes a vibration frequency control section 431 for variably controlling at least one of the detection frequency $f_1$ and the drive frequency $f_0$ of the capacitance type angular velocity transducer 100, a detection circuit 420 for detecting angular velocity based on the detection signal from the capacitance type angular velocity transducer 100, a drive circuit 410 for performing drive for vibrating the capacitance type angular velocity transducer 100, and a storage section 440 for storing correction parameters (circuit parameters). Further, the storage section 440 stores a correction parameter group for correcting the sensor characteristic of the capacitance type angular velocity transducer 100 in accordance with the variation of at least one of the detection frequency $f_1$ and the drive frequency $f_0$.

Here, as described above, the drive direction, the direction of the axis (detection axis) of the input angular velocity, and the detection direction are perpendicular to each other. Therefore, in detail, the vibration frequency control section 431 is for variably controlling at least one of the detection frequency $f_1$ as the vibration frequency in a first direction perpendicular to the detection axis of the angular velocity, and the drive frequency $f_0$ as the vibration frequency in a second direction perpendicular to the detection axis and the first direction.

Figure 8:
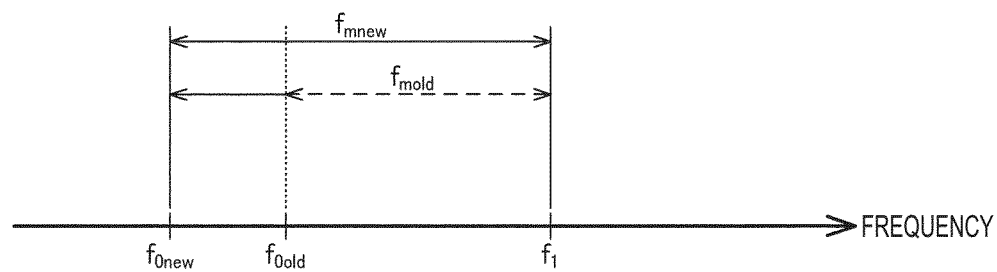
FIG. 8 is a diagram showing a control example of the mistuned frequency.

According to the method of the present embodiment, firstly, since the vibration frequency control section 431 is provided, at least one of the detection frequency $f_1$ and the drive frequency $f_0$ can variably be controlled. Thus, the control of the mistuned frequency fm becomes possible. FIG. 8 shows an example of the control of the mistuned frequency fm. In the example shown in FIG. 8, due to the control by the vibration frequency control section 431, the drive frequency $f_0$ is changed from $f_{0old}$ to $f_{0new}$, and the mistuned frequency is changed from $fm_{old}$ to $fm_{new}$. Thus, even in the case in which the frequency of the rotational vibration not subject to detection is close to $fm_{old}$, by changing the mistuned frequency to $fm_{new}$, it is possible to increase the difference between the frequency of the input angular velocity and the mistuned frequency fm. In other words, it is possible to prevent the signal due to the rotational vibration from being input to the circuit device 40 as an excessively large signal.

Further, in the method according to the present embodiment, there is stored in advance the correction parameter group for correcting the variation of the sensor characteristic due to the change in at least one of the drive frequency $f_0$ and the detection frequency $f_1$. Therefore, since it is possible not only to change the mistuned frequency fm, but also appropriately change other parameters in conjunction with the change, it becomes possible to accurately detect the angular velocity.

Hereinafter, a detailed configuration example of the circuit device 40 and the capacitance type angular velocity transducer 100 according to the present embodiment is described, and then, a specific example of the sensor characteristic varying in accordance with the change in the mistuned frequency fm is described. Further, the details of the correction parameter group will be described, and then some modified examples will be described. Finally, examples of a variety of devices including the circuit device 40 will be described.

It should be noted that in the following description, a method of changing the drive frequency $f_0$ and fixing the detection frequency $f_1$ as shown in FIG. 8 will be described as a specific example of the control of at least one of the detection frequency $f_1$ and the drive frequency $f_0$. It should be noted that it is possible to change the detection frequency $f_1$ and fix the drive frequency $f_0$, or to change both of the drive frequency $f_0$ and the detection frequency $f_1$.

2. Configuration Example of Angular Velocity Transducer and Circuit Device

Figure 9:
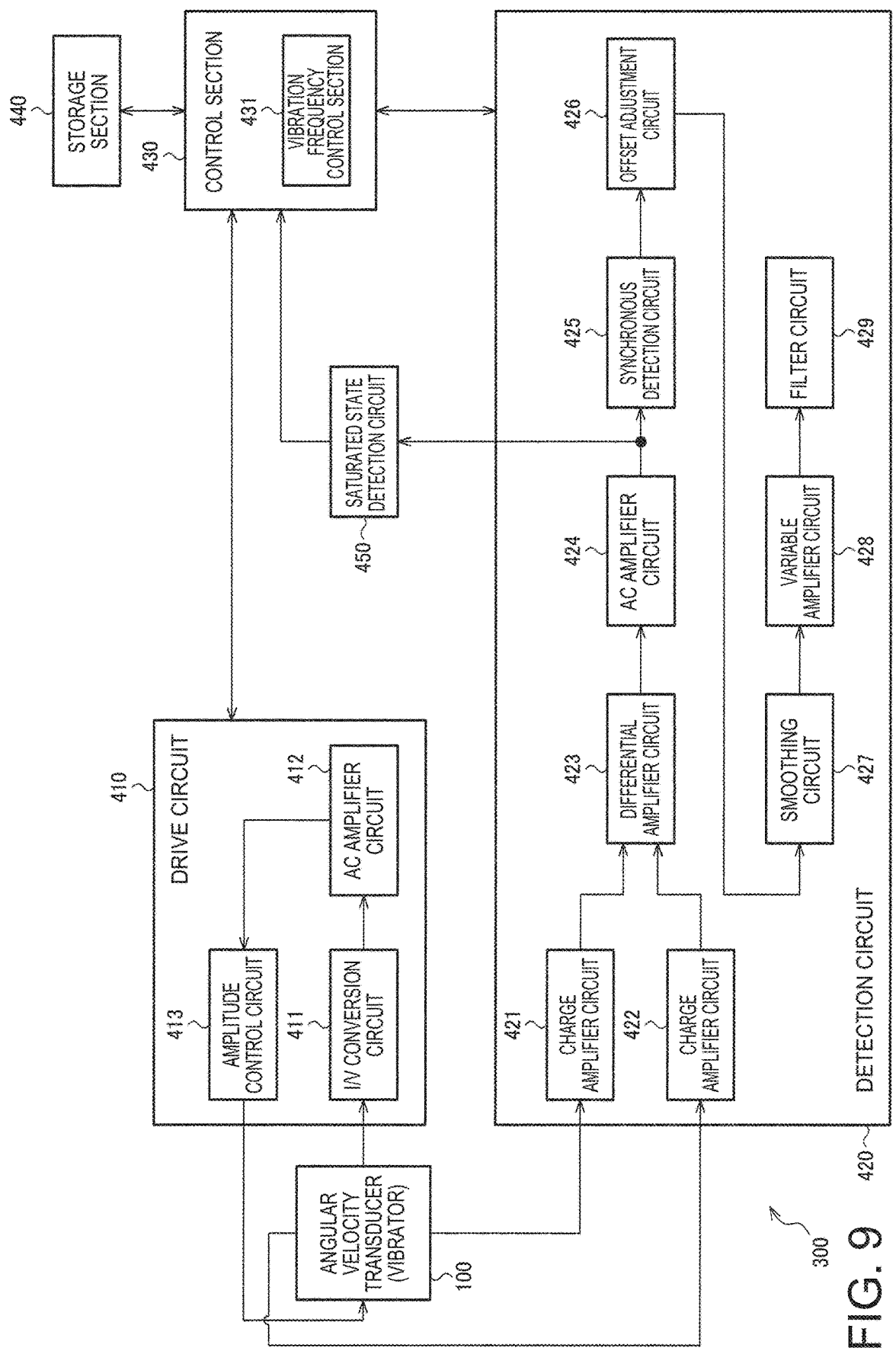
FIG. 9 is a diagram showing a detailed configuration example of the circuit device.

FIG. 9 shows a configuration example of the physical quantity detection device 300 including the circuit device 40 and the capacitance type angular velocity transducer 100 (the vibrator element) according to the present embodiment. As shown in FIG. 9, the circuit device 40 includes the drive circuit 410, the detection circuit 420, the control section 430, the storage section 440, and a saturated state detection circuit 450. Further, the drive circuit 410 has an I/V conversion circuit (a current/voltage conversion circuit) 411, an AC amplifier circuit 412, and an amplitude control circuit 413. Further, the detection circuit 420 includes charge amplifier circuits 421, 422, a differential amplifier circuit 423, an AC amplifier circuit 424, a synchronous detection circuit 425, an offset adjustment circuit 426, a smoothing circuit 427, a variable amplifier circuit 428, and a filter circuit 429. The circuit device 40 is incorporated in, for example, an IC chip not shown in FIG. 9. It should be noted that the configuration of the circuit device 40 is not limited to the configuration shown in FIG. 9, but it is possible to adopt a variety of practical modifications such as elimination of some of the constituents or addition of other constituents.

The drive circuit 410 is a circuit for supplying the drive signal to drive electrodes provided to the capacitance type angular velocity transducer 100. The drive electrodes correspond to a movable drive electrode 116 and stationary drive electrodes 130, 132 in an example of the capacitance type angular velocity transducer 100 described later with reference to FIG. 10. The drive circuit 410 will hereinafter be described in detail.

When the capacitance type angular velocity transducer 100 vibrates, the capacitance varies, and the variation in capacitance is converted by the voltage applied between the electrodes into a current, and then the current is output. In the case of the example of the capacitance type angular velocity transducer 100 described later with reference to FIG. 10, the capacitance between a movable monitor electrode 118 and a stationary monitor electrode 160, and the capacitance between the movable monitor electrode 118 and a stationary monitor electrode 162 vary, and the currents in the stationary monitor electrodes 160, 162 vary. The currents from the stationary monitor electrodes 160, 162 are input to the I/V conversion circuit 411. The I/V conversion circuit 411 converts the alternating current thus input into an alternating-current voltage signal with the same frequency as the vibration frequency of the capacitance type angular velocity transducer 100, and then outputs the alternating-current voltage signal.

The alternating-current voltage signal output from the I/V conversion circuit 411 is input to the AC amplifier circuit 412. The AC amplifier circuit 412 amplifies the alternating-current voltage signal thus input, and then outputs the result. The alternating-current voltage signal output from the AC amplifier circuit 412 is input to the amplitude control circuit 413. The amplitude control circuit 413 controls the gain so as to keep the amplitude of the alternating-current voltage signal thus input at a constant value, and outputs the alternating-current voltage signal, the gain of which is controlled, to the drive electrodes via drive signal terminals provided to the capacitance type angular velocity transducer 100. Due to the alternating-current voltage signal (the drive signal) input to the drive electrodes, the capacitance type angular velocity transducer 100 vibrates.

It should be noted that a direct-current voltage signal for supplying a stationary electrical potential to an electrostatic spring (an electrostatic spring se1 shown in FIG. 12 described later) is also output to the capacitance type angular velocity transducer 100. In the present embodiment, the description will be presented assuming that the drive signal output from the drive circuit 410 includes a direct-current voltage signal (Vdc) and an alternating-current voltage signal (Vac·sin (ωt)), and the amplitude control circuit 413 performs control of both of the voltages Vdc and Vac.

The detection circuit 420 is a circuit for performing differential amplification of a first detection signal generated in a first detection electrode of the capacitance type angular velocity transducer 100 and a second detection signal generated in a second detection electrode to generate a differentially-amplified signal, and then detecting a predetermined physical quantity based on the differentially-amplified signal. In the example of the capacitance type angular velocity transducer 100 described later with reference to FIG. 10, the first detection electrode corresponds to a stationary detection electrode 140, and the second detection electrode corresponds to a stationary detection electrode 142. The detection circuit 420 will hereinafter be described in detail.

To the charge amplifier circuits 421, 422, detection signals (alternating current) opposite in phase to each other and detected by the stationary detection electrodes 140, 142 are input via detection signal terminals. For example, to the charge amplifier 421, there is input the first detection signal detected by the stationary detection electrode 140, and to the charge amplifier 422, there is input the second detection signal detected by the stationary detection electrode 142. Then, the charge amplifier circuits 421, 422 convert the detection signals (the alternating current) thus input into an alternating-current voltage signal centered on a reference voltage Vref.

The differential amplifier circuit 423 performs differential amplification of the output signal of the charge amplifier circuit 421 and the output signal of the charge amplifier circuit 422 to generate the differentially-amplified signal. The output signal (the differentially-amplified signal) of the differential amplifier circuit 423 is further amplified by the AC amplifier circuit 424.

The synchronous detection circuit 425 extracts an angular velocity component by synchronously detecting the output signal of the AC amplifier circuit 424 based on the alternating-current voltage signal output by the AC amplifier circuit 412 of the drive circuit 410.

The offset adjustment circuit 426 performs adjustment of the offset value on the signal of the angular velocity component extracted by the synchronous detection circuit 425. The offset adjustment circuit 426 here is a circuit for performing a correction process using an offset correction value for correcting, for example, the zero point. The signal having been corrected is smoothed by the smoothing circuit 427 into the direct-current voltage signal, and then the direct-current voltage signal is input to the variable amplifier circuit 428.

The variable amplifier circuit 428 amplifies (or attenuates) the output signal (the direct-current voltage signal) of the smoothing circuit 427 at a preset gain (or attenuation rate) to vary the angular velocity sensitivity. The signal amplified (or attenuated) by the variable amplifier circuit 428 is input to the filter circuit 429.

The filter circuit 429 attenuates a high-frequency noise component in the output signal of the variable amplifier circuit 428, and generates a detection signal with the polarity and the voltage level corresponding to the direction and the magnitude of the angular velocity. It should be noted that although not shown in FIG. 9, it is also possible that the circuit device 40 includes a processing section (digital signal processor (DSP)), and the output of the filter circuit 429 is converted by an A/D conversion circuit, and is then output to the processing section.

The control section 430 performs control for changing the mistuned frequency fm, and control for correcting the sensor characteristic due to the change in the mistuned frequency fm. The control section 430 includes the vibration frequency control section 431. The vibration frequency control section 431 outputs a signal for controlling at least one of the drive frequency $f_0$ and the detection frequency $f_1$ to the drive circuit 410 (the amplitude control circuit 413). Specifically, the vibration frequency control section 431 reads out a given correction parameter from the correction parameter group stored in the storage section 440, and instructs the drive circuit 410 to perform the control based on the correction parameter thus readout. Further, it is also possible for the control section 430 to perform the control of a zero-point correction, a sensitivity correction, and a temperature characteristic correction as described later. A specific method will be described later.

The storage section 440 stores the correction parameter group. The data structure of the correction parameter group will be described later with reference to FIG. 14. Further, it is also possible for the storage section 440 to store information different from the correction parameter group.

The saturated state detection circuit 450 detects the saturated state of the signal in the detection circuit 420. It should be noted that although it is assumed in FIG. 9 that the saturated state detection circuit 450 performs the detection of the saturated state using the output signal of the AC amplifier circuit 424, a variety of practical modifications can be adopted to this point, and it is also possible to use an output signal of another block in the detection circuit 420. The details of the saturated state detection circuit 450 will be described later. Further, a practical modification of eliminating the saturated state detection circuit 450 can also be adopted.

Figure 10:
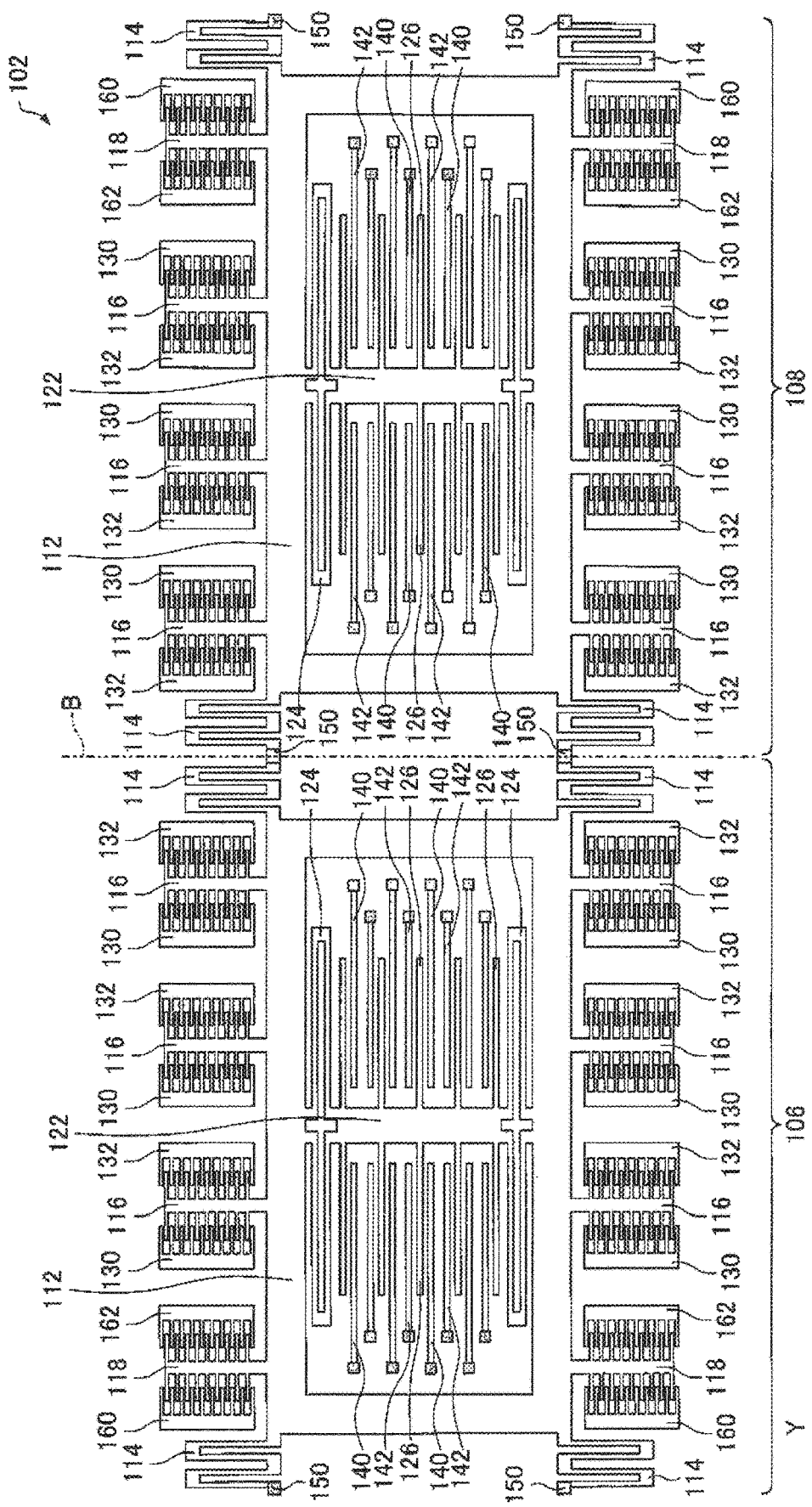
FIG. 10 is a diagram showing an example of a structure of the capacitance type angular velocity transducer.

Then, a specific example of the capacitance type angular velocity transducer 100 will be described with reference to FIG. 10 and FIG. 11. FIG. 10 is a plan view schematically showing the structure of the capacitance type angular velocity transducer 100. The capacitance type angular velocity transducer 100 includes a first structure 106 and a second structure 108. The first structure 106 and the second structure 108 are connected to each other along the X axis. The first structure 106 is located on the −X-direction side of the second structure 108. The structures 106, 108 have, for example, a shape symmetrical about the boundary line B (a straight line extending along the Y axis) between the structures as shown in FIG. 10. It should be noted that a practical modification of eliminating the structure 108 can also be adopted.

As shown in FIG. 10, the structures 106, 108 each have a vibrating body 112, first spring sections 114, the movable drive electrodes 116, a displacement section 122, second spring sections 124, the stationary drive electrodes 130, 132, the movable monitor electrodes 118, movable detection electrodes 126, the stationary detection electrodes 140, 142, and the stationary monitor electrodes 160, 162.

The vibrating body 112, the first spring sections 114, the second spring sections 124, the movable drive electrodes 116, the movable monitor electrodes 118, the displacement section 122, the movable detection electrodes 126, and fixation sections 150 are formed integrally by, for example, processing a silicon substrate (not shown) bonded to the substrate. Thus, it becomes possible to apply a fine processing technology used in the production of silicon semiconductor devices, and miniaturization of the capacitance type angular velocity transducer 100 can be achieved. The material used here is silicon provided with electrical conductivity by doping impurities such as phosphorus or boron.

The first spring sections 114 are configured so that the vibrating body 112 can be displaced in the X-axis direction. More specifically, the first spring sections 114 each have a shape extending in the X-axis direction (along the X axis) while reciprocating in the Y-axis direction (along the Y axis).

The movable drive electrodes 116 are connected to the vibrating body 112, and extend from the vibrating body 112 in the +Y direction and the −Y direction. The movable drive electrodes 116 can vibrate along the X axis due to the vibration of the vibrating body 112.

The stationary drive electrodes 130, 132 are disposed so as to be opposed to the movable drive electrode 116, and sandwich the movable drive electrode 116. The plurality of stationary drive electrodes 130, 132 is disposed so that the number of the stationary drive electrodes 130, 132 corresponds to the number of the movable drive electrodes 116, and is arranged in the X-axis direction. In the example shown in FIG. 10, the stationary drive electrodes 130, 132 each have a comb-like shape, and the movable drive electrodes 116 each have a shape, which can be inserted between the comb teeth of the stationary drive electrodes 130, 132. The stationary drive electrodes 130, 132 and the movable drive electrodes 116 are electrodes for vibrating the vibrating body 112.

The movable monitor electrodes 118 are connected to the vibrating body 112, and extend from the vibrating body 112 in the +Y direction and the −Y direction. The planar shape of each of the movable monitor electrodes 118 is the same as, for example, the planar shape of each of the movable drive electrodes 116. The movable monitor electrodes 118 can vibrate along the X axis due to the vibration of the vibrating body 112.

The stationary monitor electrodes 160, 162 are disposed so as to be opposed to the movable monitor electrode 118, and sandwich the movable monitor electrode 118. The planar shapes of the stationary monitor electrodes 160, 162 are the same as, for example, the planar shapes of the stationary monitor electrodes 130, 132, respectively. The stationary monitor electrodes 160, 162 and the movable monitor electrodes 118 are electrodes for detecting a signal varying in accordance with the vibration of the vibrating body 112, and are electrodes for detecting the vibration state of the vibrating body 112. Specifically, the stationary monitor electrodes 160, 162 and the movable monitor electrodes 118 are used for feedback control of the drive signal by outputting the current corresponding to the capacitance variation to the I/V conversion circuit 411 of the drive circuit 410 as described above.

The displacement section 122 is connected to the vibrating body 112 via the second spring sections 124. In the example shown in the drawing, the planner shape of the displacement section 122 is a rectangle having long sides along the Y axis. The second spring sections 124 are configured so that the displacement section 122 can be displaced in the Y-axis direction.

The movable detection electrodes 126 are connected to the displacement section 122. The movable detection electrodes 126 extend from the displacement section 122 in the +X direction and the −X direction.

One end of each of the stationary detection electrodes 140, 142 is fixed on the substrate, and the other end thereof extends toward the displacement section 122 as a free end. The stationary detection electrodes 140, 142 are disposed so as to be opposed to the movable detection electrode 126, and sandwich the movable detection electrode 126. More specifically, in the stationary detection electrodes 140, 142 sandwiching the movable detection electrode 126, the stationary detection electrode 140 is disposed on the −Y direction side of the movable detection electrode 126, and the stationary detection electrode 142 is disposed on the +Y direction side of the movable detection electrode 126 in the first structure 106. In the second structure 108, the stationary detection electrode 140 is disposed on the +Y direction side of the movable detection electrode 126, and the stationary detection electrode 142 is disposed on the −Y direction side of the movable detection electrode 126.

Then, an operation of the capacitance type angular velocity transducer 100 will be described. FIG. 11 is a diagram for explaining the operation of the capacitance type angular velocity transducer 100. It should be noted that in FIG. 11, the movable drive electrodes 116 and so on are omitted to simplify the illustration for the sake of convenience.

When a voltage is applied by the drive circuit 410 between the movable drive electrodes 116 and the stationary drive electrodes 130, 132, electrostatic force is generated between the movable drive electrodes 116 and the stationary drive electrodes 130, 132. Thus, as shown in FIG. 11, it is possible to extend and contract the first spring sections 114 along the X axis, and thus it is possible to vibrate the vibrating body 112 along the X axis.

More specifically, the drive circuit 410 provides the movable drive electrodes 116 with the constant potential Vdc. Further, the drive circuit 410 applies a first alternating-current voltage to the stationary drive electrodes 130 with reference to the potential Vdc, and applies a second alternating-current voltage with the phase shifted 180 degrees from the phase of the first alternating-current voltage to the stationary drive electrodes 132 with reference to the potential Vdc.

Here, in the stationary drive electrodes 130, 132 sandwiching the movable drive electrode 116, the stationary drive electrode 130 is disposed on the −X direction side of the movable drive electrode 116, and the stationary drive electrode 132 is disposed on the +X direction side of the movable drive electrode 116 in the first structure 106. Further, in the second structure 108, the configuration in the X-axis direction is reversed.

Therefore, it is possible to vibrate a vibrating body 112a of the first structure 106 and a vibrating body 112b of the second structure 108 at a predetermined frequency with respective phases opposite to each other along the X axis by the first and second alternating-current voltages. In the example shown in FIG. 11, the vibrating body 112a is displaced in an α1 direction, and the vibrating body 112b is displaced in an α2 direction opposite to the α1 direction.

Figure 11:
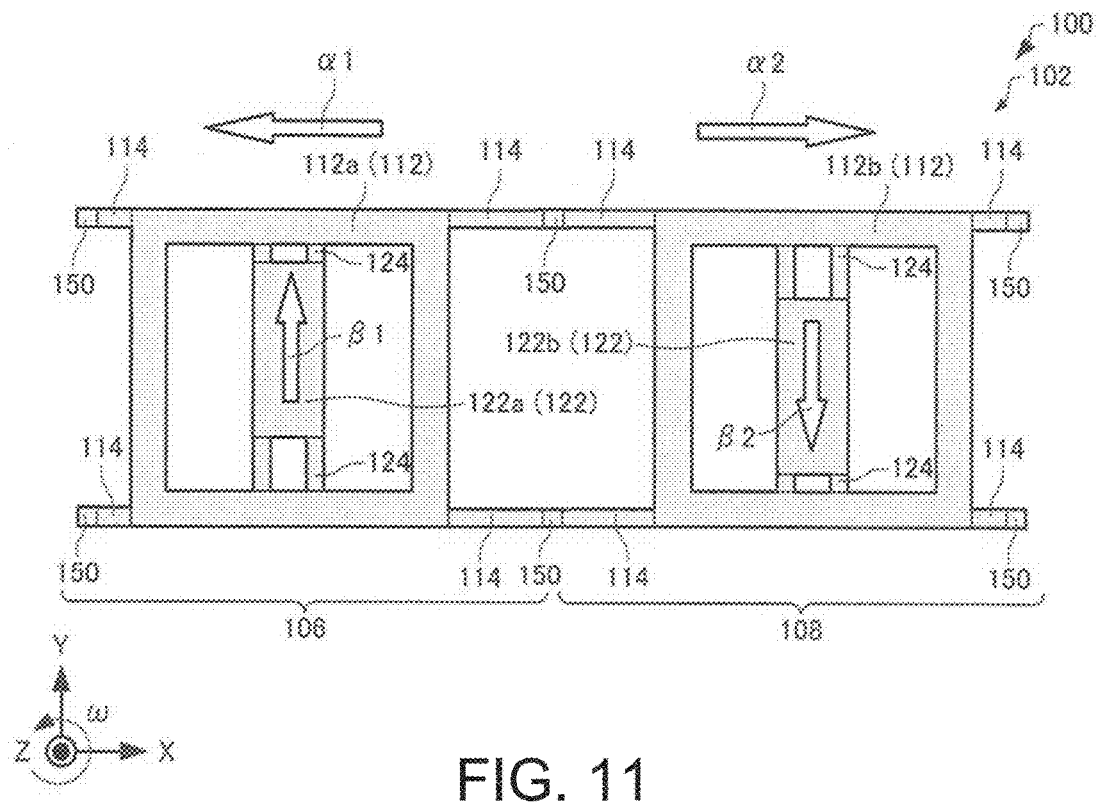
FIG. 11 is a diagram showing an operation example of the capacitance type angular velocity transducer.

As shown in FIG. 11, when an angular velocity ω around the Z axis is applied in the state in which the vibrating bodies 112a, 112b are vibrating along the X axis, Coriolis force acts on the displacement section 122, and the displacement section 122 is displaced along the Y axis. Specifically, the displacement section 122a connected to the vibrating body 112a and the displacement section 122b connected to the vibrating body 112b are displaced along the Y axis in the respective directions opposite to each other. In the example shown in FIG. 11, the displacement section 122a is displaced in a β1 direction, and the displacement section 122b is displaced in a β2 direction opposite to the β1 direction.

By the displacement sections 122a, 122b being displaced along the Y axis, the distance between the movable detection electrode 126 and the stationary detection electrode 140, and the distance between the movable detection electrode 126 and the stationary detection electrode 142 vary. Therefore, the capacitance between the movable detection electrode 126 and the stationary detection electrode 140, and the capacitance between the movable detection electrode 126 and the stationary detection electrode 142 vary.

In the detection circuit 420, by applying a voltage between the movable detection electrode 126 and the stationary detection electrode 140, the variation in the capacitance between the movable detection electrode 126 and the stationary detection electrode 140 can be detected. Similarly, the detection circuit 420 is capable of detecting the variation in the capacitance between the movable detection electrode 126 and the stationary detection electrode 142 by applying a voltage between the movable detection electrode 126 and the stationary detection electrode 142. In such a manner as described above, it is possible for the detection circuit 420 to obtain the angular velocity ω around the Z axis based on the variation of the capacitance between the movable detection electrode 126 and each of the stationary detection electrodes 140, 142.

Further, by the vibrating bodies 112a, 112b vibrating along the X axis, the distance between the movable monitor electrode 118 and each of the stationary monitor electrodes 160, 162 varies. Therefore, the capacitance between the movable monitor electrode 118 and the stationary monitor electrode 160, and the capacitance between the movable monitor electrode 118 and the stationary monitor electrode 162 vary. The drive circuit 410 applies feedback control to the drive signal based on the variation of the current flowing through each of the stationary monitor electrodes 160, 162 due to the variation of the capacitance.

3. Characteristic Variation Due to Variation of Mistuned Frequency

Then, a specific method of controlling the mistuned frequency fm will be described, and further, the sensor characteristics and the circuit parameters varying in conjunction with the mistuned frequency fm in the case of changing the mistuned frequency will be described.

3.1 Control of Mistuned Frequency

As described above with reference to FIG. 1, the drive system 11 includes the spring s1. In the case of assuming the spring constant (effective spring constant) of the spring s1 as $K_0$, and the mass of the vibrating body 10 as m, the drive frequency $f_0$ is expressed as Formula (4) below.

$$f_0 = \frac{1}{2\pi}\sqrt{\frac{K_0}{m}} \quad (4)$$

In other words, by changing the effective spring constant of the capacitance type angular velocity transducer 100, it is possible for the vibration frequency control section 431 to change at least one of the drive frequency $f_0$ and the detection frequency $f_1$. Here, as described above with reference to FIG. 8, in order to explain the example of controlling the mistuned frequency fm by changing the drive frequency $f_0$, the vibration frequency control section 431 changes the effective spring constant $K_0$ of the drive system 11 to thereby change the drive frequency $f_0$.

Figure 12:
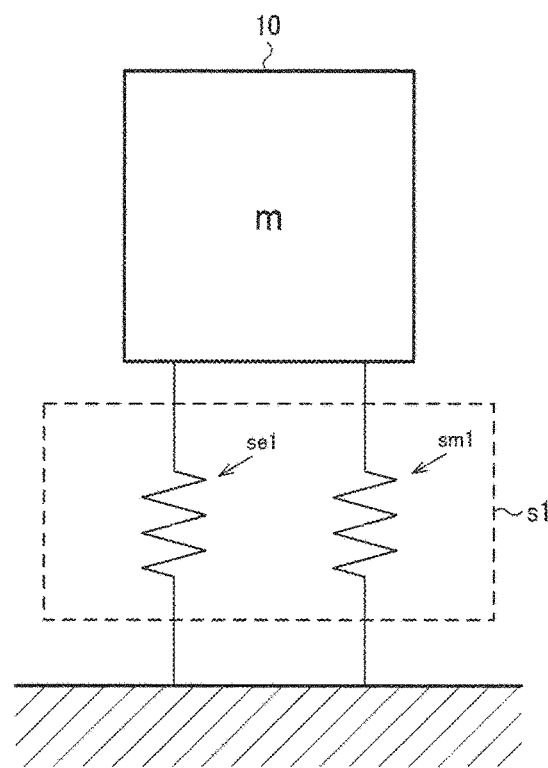
FIG. 12 is an explanatory diagram of an electrostatic spring and a mechanical spring.

FIG. 12 is a schematic diagram of the spring s1 of the drive system 11. As shown in FIG. 12, the spring s1 of the drive system 11 specifically includes a mechanical spring sm1 and the electrostatic spring se1. In the case of the example described above with reference to FIG. 10, the mechanical spring sm1 corresponds to the first spring sections 114, and the electrostatic spring se1 corresponds to the movable drive electrodes 116 and the stationary drive electrodes 130, 132. In the case of assuming the spring constant (the mechanical spring constant) of the mechanical spring sm1 as Km, and the spring constant (the electrostatic spring constant) of the electrostatic spring se1 as Ke, the effective spring constant $K_0$ is expressed as Formula (5) below. It should be noted that although omitted from the following description, the spring s2 of the detection system 12 also includes a mechanical spring sm2 and an electrostatic spring se2, the mechanical spring sm2 corresponds to the second spring sections 124, and the electrostatic spring se2 corresponds to the movable detection electrodes 126 and the stationary detection electrodes 140, 142.

$$K_0 = Km + Ke \quad (5)$$

As is understood from Formula (5) above, the change in effective spring constant can be realized by changing at least one of the mechanical spring constant Km and the electrostatic spring constant Ke. In the case of defining the direct-current voltage between the drive electrodes (between the movable drive electrodes 116 and the stationary drive electrodes 130, 132) as Vdc, the dielectric constant as ε, the area of the electrodes as S, and the distance between the electrodes as x, the electrostatic spring constant Ke is expressed as Formula (6) below. It should be noted that with the view of the fact that the attractive force between the electrodes is increased by increasing the voltage applied to the electrostatic spring se1, the electrostatic spring constant Ke is expressed with the negative sign attached.

$$Ke = -\frac{S \cdot \varepsilon \cdot Vdc^2}{x^3} \quad (6)$$

As is understood from Formula (6) above, the electrostatic spring constant Ke can easily be controlled by controlling the voltage applied between the drive electrodes. Therefore, it is preferable for the vibration frequency control section 431 in the present embodiment to change at least one of the drive frequency $f_0$ and the detection frequency $f_1$ by changing the electrostatic spring constant Ke of the capacitance type angular velocity transducer 100. By adopting this process, it becomes possible to more easily control the effective spring constant compared to the case of controlling the mechanical spring constant Km.

It should be noted that it is not precluded to mechanically tune the mechanical spring sm1 to thereby change the mechanical spring constant Km. The method of controlling the mechanical spring constant Km will be described later as a modified example.

As described using Formulas (4) through (6) described above, the drive frequency $f_0$ can be controlled by controlling the direct-current voltage Vdc between the drive electrodes. For example, in the case of lowering the drive frequency $f_0$ as shown in FIG. 8, it is sufficient to decrease the electrostatic spring constant Ke in the drive vibration, and by increasing the voltage Vdc between the drive electrodes to thereby increase the absolute value of the electrostatic spring constant Ke (decrease the value Ke since Ke is a negative value), the effective spring constant $K_0$ is decreased. In this case, since $K_0$ decreases without changing m in Formula (4) above, the drive frequency $f_0$ can be made lower compared to the value which has not been controlled.

The voltage between the drive electrodes is output from the drive circuit 410 as the drive signal. If the drive amplitude varies, the Coriolis force generated per unit angular velocity varies. Therefore, in the drive circuit 410 of the physical quantity detection device 300 (the angular velocity sensor), the drive signal is controlled so as to keep the drive amplitude constant. Specifically, as described above with reference to FIG. 9, the drive circuit 410 includes the amplitude control circuit 413 for controlling the amplitude of the drive vibration, and in the present embodiment, there is assumed an example in which the amplitude control circuit 413 is also capable of controlling the direct-current voltage (Vdc). Therefore, the vibration frequency control section 431 of the present embodiment outputs the signal for controlling Vdc as the direct-current component out of the drive signal to the amplitude control circuit 413 of the drive circuit 410 to thereby control the mistuned frequency fm.

3.2 Variation of Sensor Sensitivity Due to Variation of Excitation Force

In the case of using such a comb-like electrode as described above with reference to FIG. 10, in the case of assuming the direct-current voltage to be applied as Vdc, and the alternating-current voltage to be applied as Vac·sin($\omega t$), the excitation force Fes to be generated is approximated by Formula (7) below.

$$Fes \approx 2 \cdot Vdc \cdot Vac \cdot \sin(\omega t) \quad (7)$$

As is understood from. Formula (7) above, in the case of varying Vdc in order to vary the mistuned frequency fm, the excitation force to be generated also varies. For example, as in the example described above, in the case of increasing the direct-current voltage Vdc in order to lower the drive frequency $f_0$, the excitation force Fes with respect to the same amplitude Vac of the alternating-current voltage rises, and the drive amplitude increases. In other words, due to the raise in Vdc, the sensitivity of the sensor is shifted from an adjusted value.

Therefore, due to the change in the direct-current voltage Vdc, there arises the necessity of changing the amplitude Vac of the alternating-current voltage. As described above, in the case of raising Vdc, it is necessary to lower Vac. It should be noted that it is sufficient for the amplitude control circuit 413 of the drive circuit 410 to perform the control of Vac based on the control by the vibration frequency control section 431.

3.3 Variation of Zero Point Due to Electrostatic Coupling

Further, since Vac varies, the magnitude of an unwanted signal due to electrostatic coupling varies, and the offset value of the zero point varies. The zero point mentioned here represents the output in the case in which the input angular velocity is zero.

The unwanted signal by leakage in the electrostatic coupling is caused by the drive signal (Vac) being leaked to the input terminal or the like via the parasitic capacitance. FIG. 13 is a schematic diagram for explaining the electrostatic coupling. It should be noted that in FIG. 13, some of the constituents of the circuit device 40 are illustrated, and other constituents are omitted. The input terminals mentioned here represent two terminals (N2, N3), to which the detection signals from the detection electrodes (the stationary detection electrodes 140, 142) of the capacitance type angular velocity transducer 100 are input, out of the terminals of the IC. Here, the terminal to which the first detection signal from the stationary detection electrode 140 is input is defined as a first input terminal N2, and the terminal to which the second detection signal from the stationary detection electrode 142 is input is defined as a second input terminal N3. Further, a terminal from which the drive signal is output to the capacitance type angular velocity transducer 100 is defined as an output terminal N1. The capacitance coupling is formed by the parasitic capacitance Ca between the terminals N1, N2 and the parasitic capacitance Cb between the terminals N1, N3, and in the vicinity of the drive signal frequency, the drive signal is superimposed on both of the first detection signal and the second detection signal via the parasitic capacitances Ca, Cb as the unwanted signal by the leakage in the electrostatic coupling.

Further, since the unwanted signal to be superimposed on the first detection signal and the unwanted signal to be superimposed on the second detection signal are in-phase with each other, it becomes possible to be removed by the differential amplifier circuit 423. It should be noted that since Ca=Cb is not necessarily true, in the case in which the parasitic capacitances Ca, Cb are not equal to each other, the unwanted signal due to the leakage in the electrostatic coupling superimposed on the first detection signal and the unwanted signal due to the leakage in the electrostatic coupling superimposed on the second detection signal are different in magnitude from each other. In this case, the unwanted signal due to the leakage in the electrostatic coupling remains unremoved, and is detected as the offset voltage. In other words, in the case of varying Vac, the offset voltage (the offset value at the zero point) due to the leakage in the electrostatic coupling also varies in conjunction therewith.

For example, there is assumed the case of varying the value of Vac from Vac1 to Vac2. It is known that the offset value at the zero point corresponding to Vac1 is, for example, "+1" before varying Vac, and the zero point is adjusted in accordance with the offset value. Specifically, the offset correction value corresponding to "−1" is stored in advance in the circuit device 40 (in particular in the storage section 440), and by performing the correction with the offset correction value, 1+(−1)=0 results, and thus, the adjustment of the zero point is achieved. This correction process is performed by the offset adjustment circuit 426 shown in FIG. 9 based on the control by, for example, the control section 430.

By varying Vac to Vac2, the offset value varies to, for example, "+2." In this case, if the offset correction value "−1" for Vac1 is used without change, the adjustment result by the offset adjustment circuit 426 is 2+(−1)=1, which causes the offset error.

As described above, by varying Vac in accordance with the change in Vdc, the offset value at the zero point varies as a result. Therefore, in the circuit device 40, it is necessary to perform the offset adjustment in order to suppress the offset error.

3.4 Variation of Sensor Sensitivity Due to Variation of Mistuned Frequency

Further, by the mistuned frequency fm varying, a resonance gain varies, and the Coriolis force, which is generated when the unit angular velocity is applied, also varies. In other words, the sensitivity of the sensor varies. In the case of the analog type gyro sensor (the physical quantity detection device 300) shown in FIG. 9, the sensitivity denotes a variation per unit angular velocity of the output voltage (direct-current voltage), and corresponds to the gradient of a straight line of the output voltage. Further, in a digital type gyro sensor, a digital code obtained by performing A/D conversion on the output voltage is output, and the sensitivity denotes a variation per unit angular velocity of the digital code.

In the case of, for example, lowering the drive frequency $f_0$ to raise the mistuned frequency fm, since the resonance gain decreases, the sensitivity of the sensor is lowered. In the example shown in FIG. 2, even in the condition in which the $f_{\Omega}$ is the same, if $f_0$ is lowered, the intersection between $f_0+f_{\Omega}$, which is the frequency indicated by A3, and the detection mode (A2) is shifted leftward, and therefore, the amplitude at the intersection becomes smaller compared to A5. Since the output (the output voltage or the digital code) of the gyro sensor is determined in accordance with the amplitude (the displacement) in the detection direction of the vibrating body 10, if the amplitude decreases, the sensor sensitivity decreases.

Therefore, in the circuit device 40, it is necessary to correct the variation of the sensor sensitivity. For example, in the case of raising the mistuned frequency fm to lower the sensitivity of the sensor, the gain to the signal is increased in the detection circuit 420. The control of the sensor sensitivity is performed by the variable amplifier circuit 428 shown in FIG. 9 using the gain setting value based in the control by, for example, the control section 430. Specifically, the variable amplifier circuit 428 controls the gradient of the straight line representing the relationship between the angular velocity and the output voltage (the output code).

3.5 Variation of Zero Point and Zero-Point Temperature Characteristic Due to Mechanical Coupling Further, by the mistuned frequency fm varying to vary the resonance gain, the magnitude of the offset voltage due to the mechanical coupling (mechanical vibration leakage) also varies. The mechanical coupling mentioned here denotes the fact that the drive vibration is transmitted to the detection vibration to cause the signal during rest. The unwanted signal due to the mechanical coupling is almost removed by the synchronous detection circuit 425 shown in FIG. 10, but partially remains as the leakage to affect the offset at the zero point. Similarly to the case of the electrostatic coupling, this offset also needs to be adjusted by the offset adjustment circuit 426.

Further, since the temperature characteristic of the mechanical coupling appears as the temperature characteristic of the zero point, the temperature characteristic of the zero point also varies. In the case in which, for example, the detection circuit 420 includes a zero-point temperature characteristic adjustment circuit, which is not shown in FIG. 9, in the posterior stage of the variable amplifier circuit 428, an adjustment value (a temperature characteristic correction value) in the zero-point temperature characteristic adjustment circuit is adjusted. The zero-point temperature characteristic adjustment circuit can be a circuit for adding the correction value at each temperature to the zero-point output based on, for example, the temperature information from the temperature sensor, or can also be a circuit for multiplying the output from the temperature sensor by a coefficient and then adding the result to the zero-point output.

In the case in which the drive frequency $f_0$ is lowered and thus the resonance gain is decreased as in the example described above, the zero-point temperature characteristic due to the mechanical coupling decreases. Unless this point is considered, the temperature adjustment in the zero-point temperature characteristic adjustment circuit is performed in accordance with the temperature characteristic due to the mechanical coupling before the variation, and the variation of the temperature characteristic due to the mechanical coupling occurs as the temperature characteristic at the zero point. Therefore, in the zero-point temperature characteristic adjustment circuit, it is necessary to perform the adjustment with a different adjustment value considering the temperature characteristic at the zero point after the variation of the mistuned frequency fm.

4. Correction Parameter Group

As described above, in the case of adjusting the mistuned frequency fm in order to prevent the saturation of the signal due to the rotational vibration (the resonance of the substrate) not subject to detection, the detection of the angular velocity with high accuracy cannot be realized unless a variety of circuit parameters such as the drive signal (the alternating-current voltage Vac), the offset correction value for the zero-point adjustment, the gain setting value for controlling the sensor sensitivity, and the temperature characteristic correction value for compensating the temperature characteristic are also changed at the same time.

It should be noted that in the case of changing the direct-current voltage Vdc, it is not easy to analytically obtain what values other adjustment values should be set to due to the change. For example, regarding the offset value of the zero point due to the electrostatic coupling, it is difficult to obtain a specific value if what values Ca and Cb shown in FIG. 13 will take is not known. Further, although the two parasitic capacitances, namely the parasitic capacitance between N1 and N2 and the parasitic capacitance between N1 and N3, are illustrated in FIG. 13, which terminals and interconnections the parasitic capacitance is generated between changes depending on the specific structure of the capacitance type angular velocity transducer 100. Therefore, it is extremely difficult to obtain the offset value at the zero point from Vdc. Furthermore, regarding the offset value at the zero point, it is necessary to consider both of the influence of the electrostatic coupling and the influence of the mechanical coupling as described above. Since the influence of the mechanical coupling also varies in accordance with the specific structure and the mounting accuracy of the capacitance type angular velocity transducer 100, it cannot be said that it is realistic to analytically calculate the offset correction value, which should be determined with the combination of the electrostatic coupling and the mechanical coupling, based on Vdc.

Similarly, regarding the temperature characteristic of the zero point, the analytical calculation is also difficult. Further, although in the above description, only the temperature characteristic of the mechanical coupling is mentioned, the electrostatic coupling also has a temperature characteristic. Therefore, there is a possibility that there arises a necessity of considering the combination of the electrostatic coupling and the mechanical coupling regarding the correction of the temperature characteristic of the zero point.

The sensor sensitivity also varies due to both of the variation of the excitation force Fes and the variation of the resonance gain. Therefore, in order to keep the sensor sensitivity at roughly the same level after the mistuned frequency fm has varied, it is necessary to consider both of Vac and the resonance gain. If it is possible to determine the condition such as "keeping the excitation force Fes constant," Vac could be obtained from Vdc based on Formula (4) described above. However, it cannot be said that it is easy to calculate the variation of the sensor sensitivity, in which even the influence of the resonance gain is taken into consideration, based on Vdc.

Therefore, in the present embodiment, it is preferable for the storage section 440 to store a first correction parameter for the case in which the mistuned frequency fm as the difference between the drive frequency $f_0$ and the detection frequency $f_1$ is set to a first setting value, and a second correction parameter for the case in which the mistuned frequency fm is set to a second setting value different from the first setting value as the correction parameter group.

By adopting this configuration, since it is possible to keep a plurality of sets of correction parameters corresponding to the setting of the mistuned frequency fm, even in the case of changing the setting of the mistuned frequency fm, it becomes possible to appropriately correct the sensor characteristic, which varies in conjunction with the setting of the mistuned frequency fm. It is sufficient for the correction parameters to be measured in the inspection using inspection equipment or the like in the stage in which the capacitance type angular velocity transducer 100 and the circuit device 40 are installed. For example, since the offset value at the zero point can be known based on the output in the state of being rested in the inspection equipment, the offset correction value can be obtained. Further, by detecting the signal at a predetermined temperature using an oven or the like, it is possible to obtain the temperature characteristic, and thus, the temperature characteristic correction value can be obtained. Substantially the same applies to other correction parameters, and even the parameters, which are difficult to analytically be obtained, can be determined based on an actual measurement result.

As described above, the excitation force (also related to the sensor sensitivity), the offset value at the zero point, the sensor sensitivity, and the temperature characteristic are representative of the sensor characteristics varying with the variation of the mistuned frequency fm. Therefore, it is preferable for the correction parameters to include the information having the parameter (Vdc) for setting the mistuned frequency fm and the adjustment value, which is capable of correcting the sensor characteristic corresponding to the mistuned frequency fm, combined with each other.

FIG. 14 shows a specific data structure example of the correction parameter group. Each of the first correction parameter and the second correction parameter includes at least one of the drive amplitude setting value, the offset correction value, the gain setting value, and the temperature characteristic correction value. The first correction parameter corresponds to, for example, the leftmost column in FIG. 14, and in FIG. 14, there is shown an example in which each of the correction parameters includes all of the drive amplitude setting value, the offset correction value, the gain setting value, and the temperature characteristic correction value.

The correction parameter group is written in the storage section 440, for example, before shipment of the physical quantity detection device 300, and then retrieved and then used as needed during the operation of the physical quantity detection device 300. On this occasion, the storage section 440 is required to keep the correction parameter group stored therein irrespective of ON/OFF of the power of the circuit device 40. Therefore, the storage section 440 can also be a nonvolatile memory. By adopting the nonvolatile memory as the storage section 440, it becomes possible to appropriately keep the correction parameter group.

It should be noted that the storage section 440 is not limited to the nonvolatile memory. For example, it is also possible for the correction parameter group to be stored in the memory (e.g., a storage section 250 of an electronic apparatus 200 described later with reference to FIG. 16) on the system side. On this occasion, it is sufficient for the storage section 440 of the circuit device 40 to load the correction parameter group from the memory on the system side at predetermined timing (e.g., the startup timing of the circuit device 40). Therefore, it is also possible to realize the storage section 440 of the circuit device 40 using a register and so on.

Further, the correction parameter group stored in the storage section 440 is retrieved as needed, and is then used at least one of the drive circuit 410 and the detection circuit 420. For example, it is also possible for the correction parameter different from the correction parameter used currently to be read out based on a setting change instruction from the outside. Specifically, in the case in which the user using the physical quantity detection device 300 mounted on the substrate has determined that something is wrong with the output value, the setting change instruction is input by the user, and a setting change operation is performed in the physical quantity detection device 300 (the circuit device 40).

The drive circuit 410 performs the drive operation based on either one of the correction parameters in the correction parameter group stored in the storage section 440. Specifically, the drive circuit 410 (the amplitude control circuit 413) obtains the electrostatic spring setting value (Vdc) in the correction parameter, and then controls the direct-current voltage to be output to the capacitance type angular velocity transducer 100 based on the electrostatic spring setting value. Further, the drive circuit 410 (the amplitude control circuit 413) obtains the drive amplitude setting value (Vac) in the correction parameter, and then controls the drive signal (the alternating-current voltage) to be output to the capacitance type angular velocity transducer 100 based on the drive amplitude setting value.

Further, the detection circuit 420 performs the detection operation based on either one of the correction parameters in the correction parameter group stored in the storage section 440. Specifically, the detection circuit 420 (the offset adjustment circuit 426) obtains the offset correction value in the correction parameter, and then performs the adjustment of the offset on the signal, on which the synchronous detection has been performed, based on the offset correction value. Further, the detection circuit 420 (the variable amplifier circuit 428) obtains the gain setting value in the correction parameter, and then performs the amplification process on the signal having been smoothed based on the gain setting value. Further, the detection circuit 420 (the zero-point temperature characteristic control circuit not shown) obtains the temperature characteristic correction value in the correction parameter, and then performs the correction process for compensating the temperature characteristic on the signal, on which the amplification process has been performed, based on the temperature characteristic correction value.

It should be noted that the control of changing the mistuned frequency fm, namely the control of switching from the given correction parameter to another correction parameter is not limited to the control performed based on the setting change instruction from the outside. For example, it is also possible to determine whether or not the signal is saturated in the circuit device 40, and perform the control of switching the correction parameter in the case in which it has been determined that the signal has been saturated. By adopting this configuration, it becomes possible to reduce the burden on the user and so on.

Specifically, as shown in FIG. 9, it is also possible for the circuit device 40 to include the saturated state detection circuit 450 for detecting the saturated state of the detection signal in the detection circuit 420. The saturated state detection circuit 450 includes, for example, a full-wave rectifier circuit not shown, an integrator, and a comparator. In the example shown in FIG. 9, the saturated state detection circuit 450 performs the full-wave rectification on the signal having been amplified by the AC amplifier circuit 424, and then integrates the rectified signal. It is conceivable that if the signal is in the saturated state, the integral value (the area of the full-wave rectified signal waveform) becomes equal to or higher than a predetermined value. Therefore, the comparator of the saturated state detection circuit 450 performs a comparison process between the output of the integrator and a given threshold value, and determines that the signal is saturated in the case in which the comparison result of (integral value)(threshold value) has been output. Then, in the case in which the output representing the fact that the saturation of the signal has been detected has been made from the saturated state detection circuit 450, the drive circuit 410 and the detection circuit 420 perform the drive operation, the detection operation using the correction parameter different from the present correction parameter, respectively. For example, the control section 430 reads out (selects) the new correction parameter from the storage section 440, and then instructs the operation with the correction parameter thus read out to the drive circuit 410 and the detection circuit 420.

In other words, the drive circuit 410 performs the drive operation based on the correction parameter selected based on the detection result in the saturated state detection circuit 450. Further, the detection circuit 420 performs the detection operation based on the correction parameter selected based on the detection result in the saturated state detection circuit 450.

5. Modified Examples

Hereinafter, some modified examples will be described.

In the above description, there is shown an example of varying the electrostatic spring constant Ke to thereby vary the effective spring constant $K_0$ (or the effective spring constant $K_1$ of the detection system). It should be noted that since the effective spring constant is expressed as Formula (5) above, it is also possible to vary the mechanical spring constant Km.

There can be cited a variety of methods of controlling the mechanical spring constant Km. For example, it is possible to realize the mechanical spring with a simple plate spring, and to provide the capacitance type angular velocity transducer 100 with an actuator physically connected to the plate spring, and capable of controlling the tensile force acting on the plate spring. Specifically, the actuator is a piezoelectric actuator, and it is possible to adopt a configuration of controlling the length in the longitudinal direction of the plate spring in accordance with the voltage applied to the piezoelectric actuator.

By adopting such a configuration, by controlling the voltage applied to the piezoelectric actuator, the mechanical spring constant Km can be controlled, and by varying the mechanical spring constant Km, the effective spring constant $K_0$ ($K_1$) can be varied.

Further, a variety of practical modifications can be adopted regarding which one of the plurality of correction parameters (first through N-th correction parameters) included in the correction parameter group is selected. Simply, it is possible to determine the correction parameter to be selected in a predetermined sequence such that the first correction parameter is selected, and is then switched to the second correction parameter in the case in which a problem occurs (the signal has been saturated) with the first correction parameter.

Alternatively, it is also possible to determine the correction parameter to be selected using the past history information. In the case in which the physical quantity detection device 300 is mounted on the substrate, and then incorporated in a given apparatus, the physical quantity detection device 300 is generally used continuously in that state. Therefore, in the case in which the cause of the saturation of the signal is the resonance of the substrate as described above, the possibility that the natural frequency of the substrate frequently varies is low. If the signal is saturated in the case (in the case of using a given correction parameter) in which a given mistuned frequency fm is set, there is a high possibility that the signal is similarly saturated even if the same correction parameter is used at a different timing. By contraries, if no problems occur in the case in which the given mistuned frequency fm is set, there is a high possibility that no problems occur even if the same correction parameter is used at a different timing.

Therefore, by using the history information of the selection of the correction parameter, it becomes possible to select appropriate one of the correction parameters. Specifically, it is preferable to give low selection priority to the correction parameter, which has been selected and caused a problem in the past, and give high selection priority to the correction parameter, which has not caused a problem, or the correction parameter, which has not been selected yet. Here, the "correction parameter, which has caused a problem" denotes the correction parameter, which has been selected when the setting change instruction has been input from the outside, and the correction parameter, which has been selected when the saturated state has been detected by the saturated state detection circuit 450.

6. Physical Quantity Detection Device, Electronic Apparatus, and Vehicle

Further, the method according to the present embodiment can be applied to a variety of devices including the circuit device 40 described above. For example, the method according to the present embodiment can be applied to a physical quantity detection device including the capacitance type angular velocity transducer 100 and the circuit device 40. Further, the method according to the present embodiment can also be applied to an electronic apparatus and a vehicle including the circuit device 40.

Figure 15:
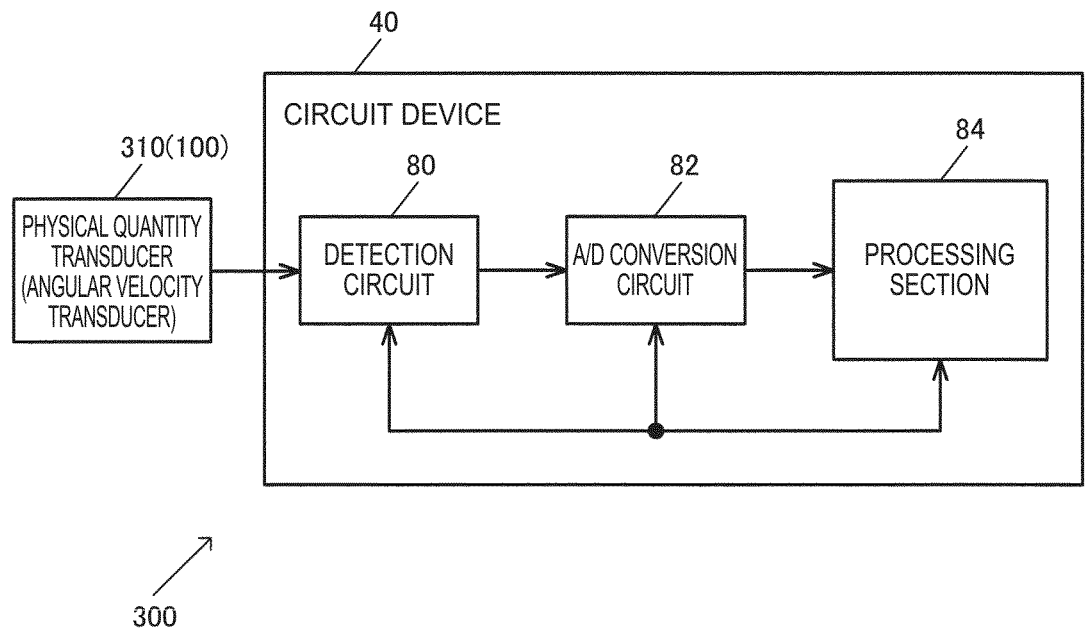
FIG. 15 is a diagram showing a configuration example of a physical quantity detection device including the circuit device according to the embodiment.

FIG. 15 shows a configuration example of the physical quantity detection device 300 according to the present embodiment. The physical quantity detection device 300 includes the capacitance type angular velocity transducer 100, and the circuit device 40 (IC) according to the present embodiment. The capacitance type angular velocity transducer 100 and the circuit device 40 are mounted in a package of, for example, the physical quantity detection device 300. It should be noted that the physical quantity detection device 300 according to the present embodiment is not limited to the configuration shown in FIG. 15, but there can be adopted various practical modifications such as elimination of some of the constituents or addition of other constituents.

The capacitance type angular velocity transducer 100 is an angular velocity sensor (a gyro sensor) as described above, and detects the angular velocity around one or more axes. The circuit device 40 includes a detection circuit 80, an A/D conversion circuit 82, and a processing section 84. The detection circuit 80 detects the angular velocity based on the detection signal from the capacitance type angular velocity transducer 100. It should be noted that it is also possible for the physical quantity detection device 300 to include a physical quantity transducer 310 other than the capacitance type angular velocity transducer 100, and detect a physical quantity signal corresponding to the physical quantity (e.g., acceleration) other than the angular velocity. The detection circuit 80 corresponds to the detection circuit 420 shown in FIG. 9, and can include an amplifier circuit (a charge/voltage conversion circuit) for amplifying the detection signal from the capacitance type angular velocity transducer 100, a synchronous detection circuit, and so on. The A/D conversion circuit 82 performs the A/D conversion of the analog voltage (the voltage of a desired signal) having been detected by the detection circuit 80. The processing section 84 performs a variety of processes based on the detection data on which the A/D conversion has been performed by the A/D conversion circuit 82. The processing section 84 performs, for example, a variety of correction processes, a filter process (a digital filter process), and so on.

Figure 16:
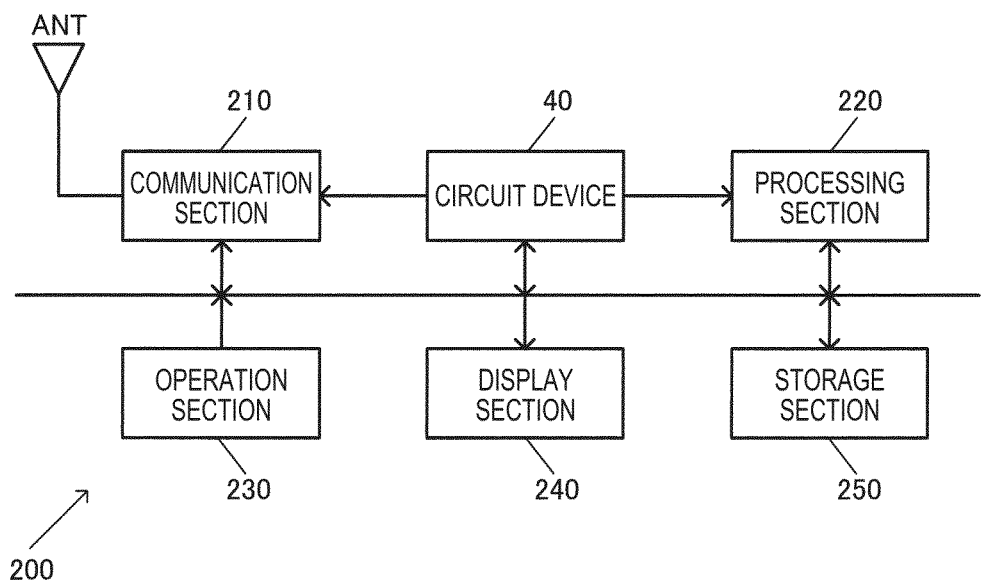
FIG. 16 is a diagram showing an example of an electronic apparatus including the circuit device according to the embodiment.

FIG. 16 shows a configuration example of an electronic apparatus 200 according to the present embodiment. The electronic apparatus 200 includes the circuit device 40 according to the present embodiment, a processing section 220, and a storage section 250. Further, the electronic apparatus 200 can include an antenna ANT, a communication section 210, an operation section 230, and a display section 240. It should be noted that the electronic apparatus 200 according to the present embodiment is not limited to the configuration shown in FIG. 16, but there can be adopted a variety of practical modifications such as elimination of some of the constituents or addition of other constituents.

As the electronic apparatus 200 according to the present embodiment, there can be assumed a variety of apparatuses such as a digital camera (a digital still camera, a video camera), a biological information detection device (e.g., a pulse meter, an activity meter, a pedometer, and a health watch), a head mounted display device, a robot, a GPS built-in watch, a car navigation system, a game machine, a variety of types of wearable equipment, a portable information terminal (e.g., a smartphone, a cellular phone, a portable video game player, and a tablet PC), a content providing terminal for delivering contents, video equipment, audio equipment, or network related equipment (e.g., abase station, and a router). In, for example, a digital camera, by using the circuit device according to the present embodiment, it is possible to realize the image stabilization and so on using the gyro sensor and the acceleration sensor. Further, in the biological information detection device, by using the circuit device according to the present embodiment, it is possible to realize the body motion detection of the user and the detection of an exercise condition using the gyro sensor and the acceleration sensor. In the robot, it is possible to use the circuit device according to the present embodiment in movable sections (arms, joints) and the main body section. As the robot, it is possible to assume both of a vehicle (running/walking robot) and an electronic apparatus (non-running/non-walking robot). In the case of the running/walking robot, the circuit device according to the present embodiment can be used for, for example, autonomous running. In the network related equipment, the circuit device according to the present embodiment can be used as a device for measuring, for example, time (e.g., absolute time) or timing.

In FIG. 16, the communication section 210 (a wireless circuit) performs a process of receiving data from the outside via the antenna ANT and transmitting data to the outside. The processing section 220 (a processor) realized by a CPU, an MPU, or the like performs a variety of types of arithmetic processing, control processing of the electronic apparatus 200, and so on based on the information stored in the storage section 250 (memory). The operation section 230 is for allowing the user to perform an input operation, and can be realized by operation buttons, a touch panel display, and so on. The display section 240 is for displaying a variety of types of information, and can be realized by a display using a liquid crystal, an organic EL, and so on. The storage 250 is for storing a variety of types of information, and the function thereof can be realized by a semiconductor memory such as a RAM or a ROM, a hard disk drive (HDD), or the like.

Further, the circuit device according to the present embodiment can be incorporated in a variety of vehicles such as a car, an airplane, a motorbike, a bicycle, a ship, and a boat. The vehicle is equipment or a device provided with a drive mechanism such as an engine or an electric motor, a steering mechanism such as a steering wheel or a helm, and a variety of electronic apparatuses, and moving on the ground, in the air, or on the sea.

Figure 17:
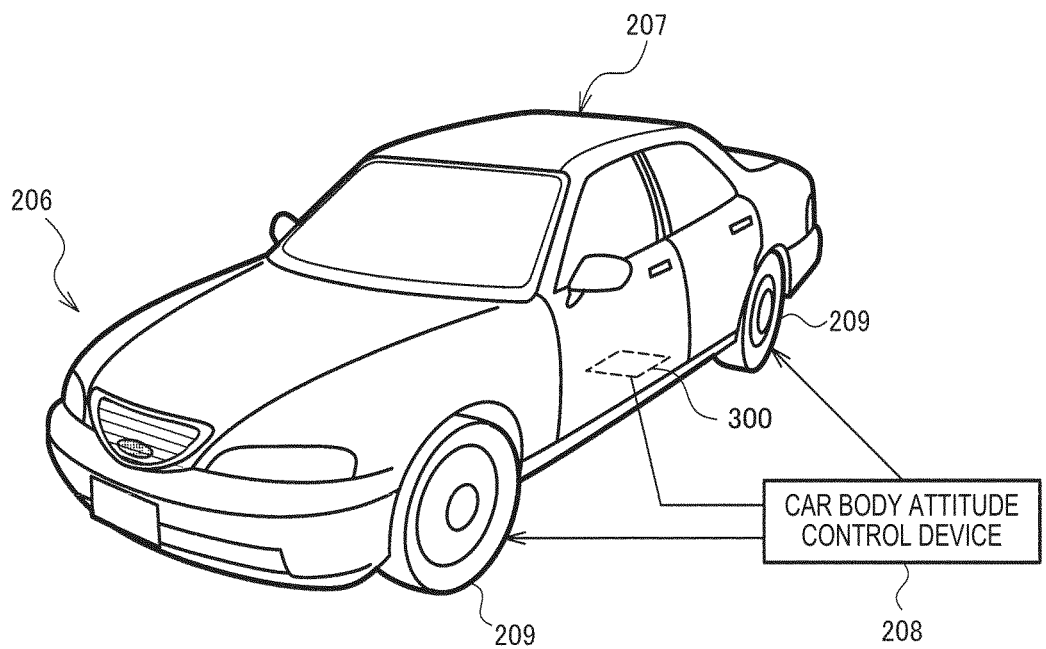
FIG. 17 is a diagram showing an example of a vehicle including the circuit device according to the embodiment.

FIG. 17 schematically shows a car 206 as a specific example of the vehicle. The car 206 incorporates the physical quantity detection device 300 including the physical quantity transducers and the circuit device. The physical quantity detection device 300 (e.g., a gyro sensor and a composite sensor for detecting the angular velocity and the acceleration) is capable of detecting the attitude of a car body 207. A detection signal of the physical quantity detection device 300 is supplied to a car body attitude control device 208. The car body attitude control device 208 is capable of, for example, controlling the stiffness of the suspension, and controlling the brake of each of the wheels 209 in accordance with the attitude of the car body 207. Besides the above, such attitude control as described above can be used for a variety of vehicles such as a two-legged robot, an airplane, and a helicopter. In realizing the attitude control, the physical quantity detection device 300 (the circuit device) is to be incorporated in the vehicle.

Although the embodiments to which the invention is applied, and the modified examples of the embodiments are hereinabove described, the invention is not limited to each of the embodiments and the modified examples of the embodiments, but can be implemented with the constituents modified within the scope or the spirit of the invention in the practical phase. Further, by arbitrarily combining the plurality of constituents disclosed in each of the embodiments and the modified examples described above, a variety of aspects of the invention can be constituted. For example, it is also possible to remove some constituents out of all of the constituents described in each of the embodiments and the modified examples. Further, it is also possible to arbitrarily combine the constituents described in the embodiments and the modified examples different from each other. Further, a term described at least once with a different term having a broader sense or the same meaning in the specification or the accompanying drawings can be replaced with the different term in any part of the specification or the accompanying drawings. As described above, a variety of modifications and applications can be made within the scope or the spirit of the invention.

The entire disclosure of Japanese Patent Application No. 2016-160393, filed Aug. 18, 2016 is expressly incorporated by reference herein.

What is claimed is:

1. A circuit device adapted to perform detection of angular velocity observed by a capacitance type angular velocity transducer, the circuit device comprising:
a vibration frequency controller adapted to variably control at least one of a detection frequency and a drive frequency of the capacitance type angular velocity transducer;

a detection circuit adapted to detect angular velocity based on a detection signal from the capacitance type angular velocity transducer;

a drive circuit adapted to perform drive of vibrating the capacitance type angular velocity transducer; and a storage adapted to store a correction parameter group adapted to correct a sensor characteristic of the capacitance type angular velocity transducer due to a variation of at least one of the detection frequency and the drive frequency, wherein the correction parameter group includes
- a first correction parameter for a case in which a mistuned frequency as a difference between the drive frequency and the detection frequency is set to a first setting value, and
- a second correction parameter for a case in which the mistuned frequency is set to a second setting value different from the first setting value, and each of the first correction parameter and the second correction parameter includes at least one of a drive amplitude setting value, an offset correction value for a zero-point adjustment, a gain setting value for controlling a sensor sensitivity, and a temperature characteristic correction value for compensating the temperature characteristic.

2. The circuit device according to claim 1, wherein the vibration frequency controller varies an effective spring constant of the capacitance type angular velocity transducer to thereby vary at least one of the drive frequency and the detection frequency.

3. The circuit device according to claim 2, wherein the vibration frequency controller varies an electrostatic spring constant of the capacitance type angular velocity transducer to thereby vary at least one of the drive frequency and the detection frequency.

4. A physical quantity detection device comprising:
the circuit device according to claim 2; and
the capacitance type angular velocity transducer.

5. The circuit device according to claim 1, wherein the storage is a nonvolatile memory.

6. The circuit device according to claim 1, wherein the detection circuit performs a detection operation based on at least one of a plurality of correction parameters in the correction parameter group stored in the storage.

7. The circuit device according to claim 1, wherein the drive circuit performs a drive operation based on at least one of a plurality of correction parameters in the correction parameter group stored in the storage.

8. A physical quantity detection device comprising:
the circuit device according to claim 1; and
the capacitance type angular velocity transducer.

9. An electronic apparatus, comprising:
the circuit device according to claim 1.

10. A vehicle comprising:
the circuit device according to claim 1.

11. A circuit device adapted to perform detection of angular velocity observed by a capacitance type angular velocity transducer, the circuit device comprising:
a vibration frequency controller adapted to variably control at least one of a detection frequency and a drive frequency of the capacitance type angular velocity transducer;
a detection circuit adapted to detect angular velocity based on a detection signal from the capacitance type angular velocity transducer;
a drive circuit adapted to perform drive of vibrating the capacitance type angular velocity transducer;
a storage adapted to store a correction parameter group adapted to correct a sensor characteristic of the capacitance type angular velocity transducer due to a variation of at least one of the detection frequency and the drive frequency; and
a saturated state detection circuit adapted to detect a saturated state of the detection signal in the detection circuit,
wherein the detection circuit performs a detection operation based on at least one of a plurality of correction parameters in the correction parameter group stored in the storage, and
wherein the detection circuit performs the detection operation based on the correction parameter selected based on a detection result in the saturated state detection circuit.

12. A circuit device adapted to perform detection of angular velocity observed by a capacitance type angular velocity transducer, the circuit device comprising:
a vibration frequency controller adapted to variably control at least one of a detection frequency and a drive frequency of the capacitance type angular velocity transducer;
a detection circuit adapted to detect angular velocity based on a detection signal from the capacitance type angular velocity transducer;
a drive circuit adapted to perform drive of vibrating the capacitance type angular velocity transducer;
a storage adapted to store a correction parameter group adapted to correct a sensor characteristic of the capacitance type angular velocity transducer due to a variation of at least one of the detection frequency and the drive frequency; and
a saturated state detection circuit adapted to detect a saturated state of the detection signal in the detection circuit,
wherein the drive circuit performs a drive operation based on at least one of a plurality of correction parameters in the correction parameter group stored in the storage, and
wherein the drive circuit performs the drive operation based on the correction parameter selected based on a detection result in the saturated state detection circuit.

* * * * *